United States Patent [19]
Strolle et al.

[11] Patent Number: 6,104,863
[45] Date of Patent: Aug. 15, 2000

[54] VIDEO SIGNAL ENCODED WITH ADDITIONAL DETAIL INFORMATION

[75] Inventors: Christopher H. Strolle, Glenside, Pa.; Jung Wan Ko, Suwon, Rep. of Korea; Raymond Schnitzler, Highland Park, N.J.

[73] Assignee: SamSung Electronics Co., Ltd., Kyungki-do, Rep. of Korea

[21] Appl. No.: 07/910,491

[22] Filed: Jul. 8, 1992

Related U.S. Application Data

[63] Continuation-in-part of application No. 07/635,197, Jan. 2, 1991, abandoned, which is a continuation-in-part of application No. 07/569,029, Aug. 17, 1990, Pat. No. 5,113,262.

[51] Int. Cl.[7] .................................................. H04N 5/76
[52] U.S. Cl. .......................................... 386/109; 348/427
[58] Field of Search .................................... 358/310, 335, 358/11, 12, 39, 330; 360/8, 33.1; 348/427, 430, 431, 571, 607; 386/1, 21, 25, 33, 95, 109, 112, 113, 114; H04N 5/76, 5/78, 5/781, 5/782, 5/783, 9/79, 11/20, 11/06, 9/77

[56] References Cited

U.S. PATENT DOCUMENTS

| | | | |
|---|---|---|---|
| 4,658,305 | 4/1987 | Tsushima | 360/65 |
| 4,660,072 | 4/1987 | Fukinuki | 358/12 |
| 4,745,460 | 5/1988 | Fukinuki | 358/12 |
| 4,750,039 | 6/1988 | Willis | 348/565 |
| 4,884,136 | 11/1989 | Ninomiya et al. | 348/701 |
| 4,970,637 | 11/1990 | Sato | 364/715.06 |
| 4,975,773 | 12/1990 | Rabii | 348/28 |
| 5,031,030 | 7/1991 | Hurst, Jr. | 358/12 |
| 5,055,915 | 10/1991 | Tsinberg | 348/386 |
| 5,063,457 | 11/1991 | Ishikawa et al. | 358/330 |
| 5,113,262 | 5/1992 | Strolle et al. | 358/310 |
| 5,239,368 | 8/1993 | Suzuki et al. | 358/41 |
| 5,561,467 | 10/1996 | Takeuchi et al. | 348/427 |

*Primary Examiner*—Thai Tran
*Assistant Examiner*—B. Nickson
*Attorney, Agent, or Firm*—Robert E. Bushnell, Esq.

[57] ABSTRACT

In video tape recording apparatus composite video signals are separated into their luminance and chrominance components for processing prior to recording. The luminance components are digitized, adaptively temporal and spatial filtered, and folded into a reduced frequency spectrum to generate a digital signal that is converted to analog form to modulate the frequency of the luminance carrier signal used in video tape recording. The chrominance components are converted to the color-under signals used in video tape recording. In video tape playback apparatus the color-under signals are converted up in frequency to provide chrominance components for inclusion in reproduced composite video signals. Also, in the video tape playback apparatus, the frequency modulation of the luminance carrier signal is detected to recover folded luminance signals which are digitized, time-base-corrected, unfolded, and adaptively temporal and spatial filtered to suppress aliases associated with unfolding to generate a digital signal that is converted to analog form to provide luminance components for inclusion in reproduced composite video signals. The backward compatability of the video tape recordings when playing them back in video tape playback apparatus already in the field is accomodated by de-emphasizing the high frequencies of the luma during recording. The high frequencies of the luma can be re-emphasized during playback to maintain substantially full NTSC or PAL luminance bandwidth.

61 Claims, 7 Drawing Sheets

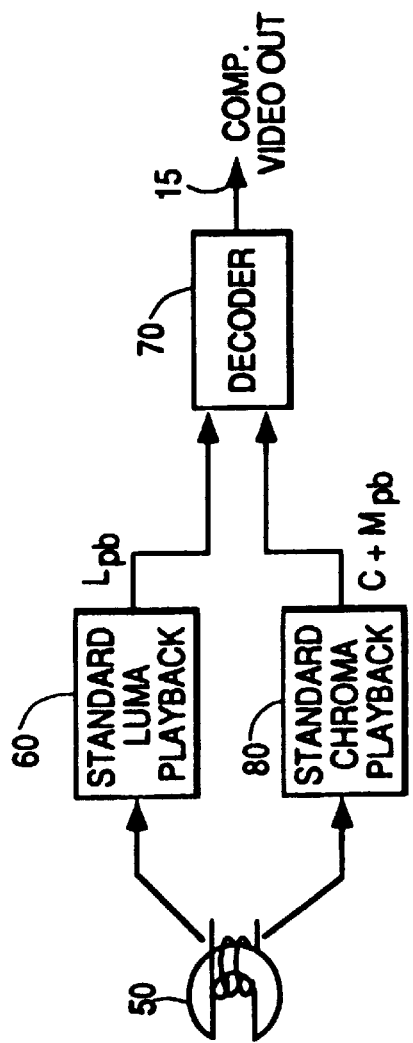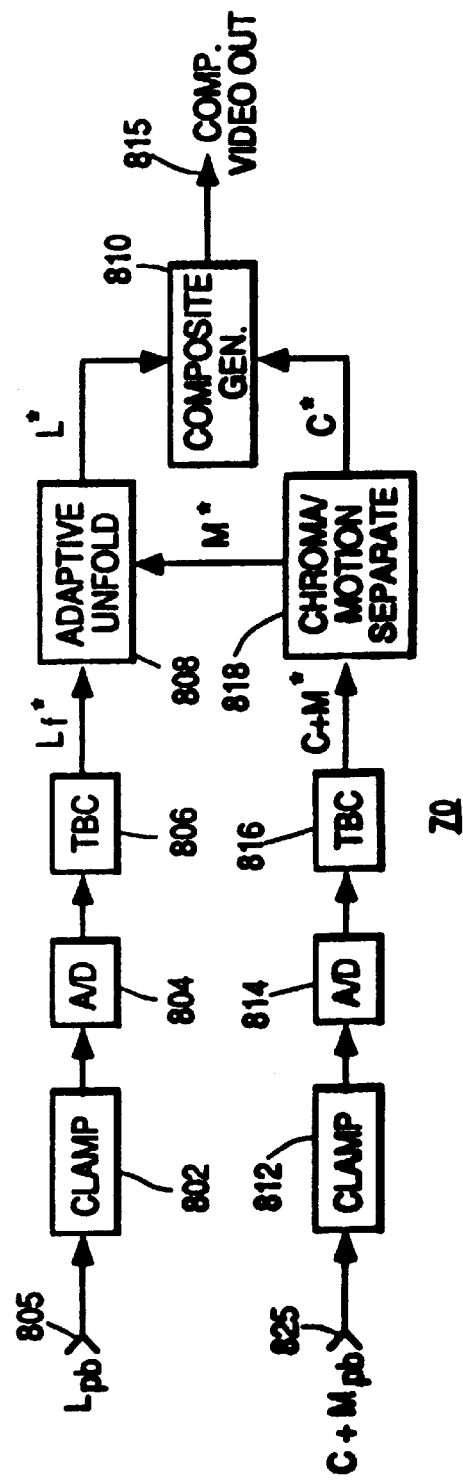

VIDEO SIGNAL ENCODED WITH ADDITIONAL DETAIL INFORMATION

This is a continuation-in-part of patent application Ser. No. 07/635,197 filed Jan. 2, 1991, now abandoned which is a continuation-in-part of patent application Ser. No. 07/569,029 filed Aug. 17, 1990, and issued May 12, 1992, as U.S. Pat. No. 5,113,262.

CROSS-REFERENCE TO RELATED APPLICATIONS

This application is related to the following applications, the claimed inventions of which were commonly owned or subject to an obligation of assignment to Samsung Electronics Co., Ltd. at the time the inventions were made:

REMOVAL OF THE FOLDING CARRIER AND SIDEBANDS FROM AN UNFOLDED VIDEO SIGNAL, Ser. No. 07/562,907, filed Aug. 6, 1990, by Strolle et al. and issued on Jul. 4, 1995, as U.S. Pat. No. 5,430,497.

CONTROL SIGNAL SPREADER, Ser. No. 07/531,057, filed May 31, 1990, by Ko et al. and issued Jan. 21, 1992, as U.S. Pat. No. 5,083,203.

APPARATUS FOR RESTORING THE CORRECT PHASE RELATION OF THE CHROMA AND LUMINANCE SIGNALS PASSES THROUGH SEPARATE PATHS, Ser. No. 07/531,144 filed May 31, 1990, by Ko et al. and issued Jan. 21, 1992, as U.S. Pat. No. 5,083,197.

COLOR-UNDER CHROMA CHANNEL ENCODED WITH AUXILIARY SIGNALS, Ser. No. 07/531,070, filed May 31, 1990, by Strolle et al. and issued Jul. 2, 1996, as U.S. Pat. No. 5,532,820.

DIGITAL MODULATORS FOR USE WITH SUBNYQUIST SAMPLING OF RASTER-SCANNED SAMPLES OF IMAGE INTENSITY, Ser. No. 07/819,890, filed Jan. 13, 1992, by Strolle et al.

BACKGROUND OF THE INVENTION

The present invention relates to a signal processing system for a video cassette recorder (VCR) yielding improved video quality while maintaining backward compatibility for playing back video cassettes recorded by this improved system on current VCR's. Current home VCRs record video information onto video tape cassettes in one of several formats. The well-known VHS system produces degraded picture quality chiefly because there is insufficient horizontal resolution. An enhanced VHS system, popularly called Super VHS (S-VHS), produces enhanced picture quality by recording a full bandwidth video signal on the video tape cassette, thus yielding improved picture quality. Such a system requires higher quality tape in the cassette and higher quality recording and playback mechanisms and circuitry. However, the S-VHS system is not backward compatible with standard VHS VCRs. That is, although a S-VHS VCR can play back cassettes recorded on either S-VHS or standard VHS VCRs, a standard VHS VCR cannot play back cassettes recorded on S-VHS VCRs.

It has long been a goal of video engineers to increase the amount of information transmitted through a given narrowband channel, such as NTSC, which is limited to 4.2 MHz of bandwidth. Because the frame and line rates are usually fixed, restricting the bandwidth translates into restricting the horizontal resolution. In some cases, the bandwidth of the channel is limited to 3 MHz or even 2.5 MHz resulting in an image with insufficient horizontal resolution.

It has been long recognized that the video spectrum has holes in which the signal energy is very small. The NTSC color system represents a system which uses one of these holes to carry the color information. In the NTSC system, the color information is recorded on a color subcarrier whose frequency is very carefully selected so that a minimum disturbance occurs when a color signal is displayed on a black and white receiver. Specifically, the frequency of the color subcarrier is interleaved horizontally, vertically, and temporally to minimize the crosstalk between the luminance and chrominance components of the composite video signal.

It was recognized at around the time of the adoption of the NTSC system that such frequency holes could also be used to transmit additional horizontal information to increase the horizontal resolution of the reproduced image. In these systems, the high frequency horizontal information was interleaved with the low frequency horizontal information in a similar manner as the chrominance information is in the NTSC color system. An article titled "REDUCTION OF TELEVISION BANDWIDTH BY FREQUENCY INTERLACE" by Howson and Bell contains a description of such a system which operated in the analog domain. This system, however, could not accurately reproduce the full bandwidth image in its original form because it was unable to completely remove the artifacts resulting from the frequency interleaving, which manifested themselves as annoying dot crawl patterns.

Sampled data digital video signal processing techniques were later developed using subNyquist sampling (sometimes termed subsampling) that remove the artifacts resulting from the frequency interleaving better than can be done in the analog regime. These techniques involve replacing every odd sample in a first video line with a zero-valued sample, and then on the next line, replacing every even sample with a zero-valued sample. On alternate frames, the patterns are reversed.

German Patent Application 82100286.2 entitled "Verfahren zum Ubertagen von Fernsehsignalen uber einen genormten bandbreitebegrenzten Ubertragunskanal und Anordnung zum Durchfuhren des Verfahrens," filed Jan. 1, 1982 by Professor Wendland et al. describes principles of offset subsampling and bandwidth compression as applied to advanced television systems. This patent also describes techniques for implementing television systems in accordance with the described principles.

Theoretically, the Howson and Bell frequency folding techniques and the subNyquist sampling technique are equivalent. But, although theoretically equivalent, the later sampled data digital systems provide improved reconstruction of the received image because of the existence of line and frame combing techniques, which had not been developed at the time of the Howson and Bell system. The subNyquist sampling techniques, however, were developed for totally sampled data digital systems as data reduction techniques. Signals generated by these systems were not intended to be passed through a narrowband analog channel.

In an article "DEVELOPMENT OF HDTV RECEIVING EQUIPMENT BASED ON BAND COMPRESSION TECHNIQUE (MUSE)", by Kojima et al. in IEEE Transactions on Consumer Electronics, Vol. CE-32, No. 4, November 1986, pp. 759–768, another data compression scheme is described which achieves bandwidth compression by sampling each pixel once every other frame. This scheme works well for nonmoving images. For moving images, a motion vector is developed, and the actual rate of sampling of each pixel is adaptively varied in response to the motion vector so that a sample of the pixel is transmitted every other frame on the average, but more often when that pixel is representing a moving image.

U.S. Pat. No. 4,831,463, issued May 16, 1989 to Faroudja, describes apparatus for processing a video signal having a predetermined bandwidth in order to pass the video information through a limited bandwidth channel, such as magnetic tape. In the apparatus described in this patent, a video signal preprocessor includes a comb filter to produce a spectral hole, such as described above, between spectrally active areas in the video signal spectrum. The combed video signal is mixed with a folding carrier signal located at a frequency just above the uppermost video signal frequency to generate an upper sideband that repeats the video signal spectrum without spectrum reversal, but with frequency translation, and a lower sideband that repeats the video signal spectrum with spectrum reversal. A low pass filter then filters the mixer result so that its bandwidth is about one-half the band-width of the original video signal. The mixer and low pass filter comprise a folding circuit of the type previously built by Howson and Bell. This folding circuit, as employed by Faroudja, in effect folds the high frequency video components of the video signal about a predetermined folding frequency, selected so that the folded high frequency component is placed in the spectral hole previously made in the video signal. The resulting signal may then be transmitted through the limited bandwidth channel.

Faroudja's U.S. Pat. No. 4,831,463 further describes a post processor which receives a folded signal from the limited bandwidth channel. The post processor includes an unfolding circuit which unfolds the received signal about a predetermined unfolding frequency. A comb filter then processes the unfolded signal to remove the alias components resulting from the unfolding process. The signal produced by this comb filter closely approximates the original video signal in terms of the bandwidth and information content.

Both the Howson article and the Faroudja patent describe folding systems which, if incorporated into an improved VCR, would not produce cassettes which would be able to be played back on present VCRs without introducing artifacts that are quite visible and therefore unacceptable in a commercial sense. This is primarily due to the magnitude of the folded high frequency component present within the low frequency component, on the previously recorded cassette. The magnitude of the folded high frequency component is sufficiently high as to introduce intolerable artifacts into an image produced from a video signal from which the folded high frequency component were not properly removed.

The Faroudja patent does not include any discussion of compatibility with pre-existing record media and apparatus, other than mention that it is one object of that invention. There is no teaching of any apparatus or process for achieving backward compatibility.

Howson and Bell did not concern themselves with backward compatibility, and the apparatus of the type they built includes a pre-emphasis filter, which boosts the high frequency components of the luminance signal in order to minimize the effect of crosstalk from the low frequency luminance components during the transmission of the folded signal through the channel. If a video cassette recorded by a VHS VCR modified to include the system described by Howson and Bell were played back on a standard VHS VCR, the interference of the pre-emphasized high frequency components which would not be removed would produce an even more objectionable image than the produced by the Faroudja system.

It is desirable that an improved video recording system be able to record wider bandwidth video signals on a standard quality cassette than those recorded by present VCRs, but maintain backward compatibility with present VCRs, and not require especially high quality magnetic tape or record and playback mechanisms. That is, it is desirable that standard quality cassettes which are recorded using the improved system be able to be played back, without noticeable visual artifacts, on present VCRs (even if the present VCR may not be able to reproduce the full bandwidth signal recorded on such a cassette).

SUMMARY OF THE INVENTION

The invention is embodied in apparatus for processing high frequency video information included in a system for processing a television-type signal, which apparatus for processing high frequency video information is constructed in the following way. A full-bandwidth input-image-representative video signal having a frequency spectrum including a lower frequency band and a higher frequency band containing information to be encoded in folded-spectrum form is supplied to means for folding the frequency spectrum of the input video signal around a prescribed folding frequency in said lower frequency band to provide a folded video signal. Means are included in the apparatus, for combining the input video signal and the folded video signal to produce a combined video signal. Means are included in the apparatus, for low pass filtering the combined video signal to provide a filtered signal, the low pass filtering means having a cut-off frequency corresponding to the folding frequency.

In preferred embodiments of the invention, the full-bandwidth video signal is filtered with an adaptive de-peaking filter before being folded around the prescribed folding frequency. De-peaking generates a signal having a low frequency component with a reduced amplitude high frequency component folded into it. Signals produced by the output of such preferred apparatus for processing high frequency video information are suitable for recording on a video cassette in accordance with a further aspect of the invention. When reproduced by a constructed VCR in accordance with further aspects of the invention, the folded reduced amplitude high frequency component may be recovered and the full-bandwidth video signal be reproduced. When reproduced on a present VCR, the high frequency component is at a low enough level so that any interference is not objectionable.

BRIEF DESCRIPTION OF THE DRAWING

In the drawing:

FIG. 8 is a block diagram of a playback section of a video recorder according to principles of the present invention;

FIG. 9 is a more detailed block diagram of a decoder in the playback section illustrated in FIG. 8;

DETAILED DESCRIPTION OF THE INVENTION

In the Figures, equalizing delays have been omitted for the purposes of simplicity. One skilled in the art of video signal processor design will appreciate the need for such delays to properly time align pixels subject to different delays on different processing paths due to the differing processing performed in those paths. One skilled in the art would understand where such delays would be necessary and how long each of the delays would have to be, and such delays will not be discussed below.

In addition, in the Figures, various filters are used for filtering in the horizontal, vertical, and temporal directions, having both high pass and low pass response characteristics. One skilled in the art of video signal processor design will appreciate that such filters may be constructed as known comb filter designs, and would understand how to properly select the delay period of the delay lines, the number of taps and the weighing of the taps. Consequently, the detailed design of such comb filters will not be discussed below, unless such a design is important for other reasons.

Also, in the Figures, and the detailed description below, various embodiments constructed in accordance with principles of the present invention are directed to an NTSC video signal. One skilled in the art would understand to modify the embodiments in order to process a PAL video signal, a SECAM video signal or a video signal according to any other standard. Such embodiments could still be constructed in accordance with principles of the present invention.

Figure 1:
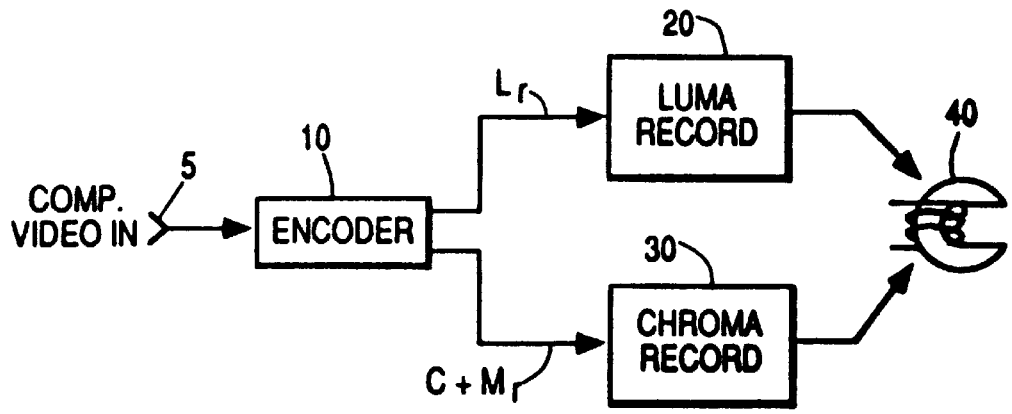
FIG. 1 is a block diagram of the record section of a video recorder according to principles of the present invention.

FIG. 1 is a block diagram of a portion of a record section of a video signal recorder according to principles of the present invention. In FIG. 1, an input terminal 5 is coupled to a source (not shown) of a video signal; for example, an NTSC composite video signal. Input terminal 5 is coupled to an input terminal of an encoder 10. A first output terminal of encoder 10 is coupled to an input terminal of a luminance record circuit 20, similar to those found in present VCRs, in which luminance record circuit 20 a folded luminance signal is used to frequency modulate a luminance carrier to generate a band of FM signals, the lower sideband of the frequency modulated luminance carrier being allowed to extend down to about 1.4 MHz and the upper sideband extending up to about 5.9 MHz. An output terminal of the luminance record circuit 20 is coupled to a record head 40 in a standard tape transport mechanism, similar to those found in present VCRs. A second output terminal of encoder 10 is coupled to an input terminal of a chrominance record circuit 30, similar to those found in present VCRs. The chrominance record circuit 30 includes circuitry for generating a color-under signal in which the quadrature amplitude modulation components of the composite video signal are translated downward in frequency—e. g., to a 629 kHz color-under carrier. The chrominance record circuit 30 also includes, in a departure from conventional practice more fully described in the above-referenced patent application Ser. No. 07/531,070, circuitry for multiplexing with the color-under signal another carrier at a frequency below the FM band encoding folded luma, which other carrier is amplitude-modulated in accordance with a motion signal. An output terminal of the chrominance record circuit 30 is also coupled to the record head 40. The record head records the signal supplied to it on magnetic tape (not shown) in a standard video cassette.

In operation, the encoder 10 takes a standard full-bandwidth NTSC signal and generates a luminance signal $L_r$, which has the same reduced bandwidth as a standard luminance signal produced by a present VCR. The luminance signal $L_r$, however, is a composite signal including a low frequency component with a reduced amplitude high frequency component folded into it. The luminance signal $L_r$, thus, contains all the information from the full-bandwidth NTSC signal, within the reduced bandwidth which can be recorded on the cassette. This allows standard quality cassettes and record and playback mechanisms to be used. In addition, the reduced amplitude of the folded high frequency signal will not cause objectionable artifacts if the recorded cassette is subsequently played back on a standard VCR. The luminance record circuit 20 records the $L_r$ signal in exactly the same manner as the reduced bandwidth luminance signal is recorded in a standard VCR. In a VHS VCR, for example, this signal is FM modulated and occupies a band of frequencies around 1.4–5.9 MHz.

The encoder 10 also produces a composite signal $C+M_r$ to be supplied to the chrominance record circuit 30. This composite signal includes the standard chrominance signal (C) as one component, and a motion representative signal ($M_r$) as another component. The motion representative signal component may be used to process the unfolded luminance signal during the playback processing, in a manner described below. The chrominance record circuit 30 records the $C+M_r$ signal in exactly the same manner as the chrominance signal is recorded in a standard VCR. In a VHS VCR, this signal is modulated to about 629 kHz. This chrominance signal is combined with the luminance signal (described above) and recorded on the video tape in the cassette.

Figure 2:
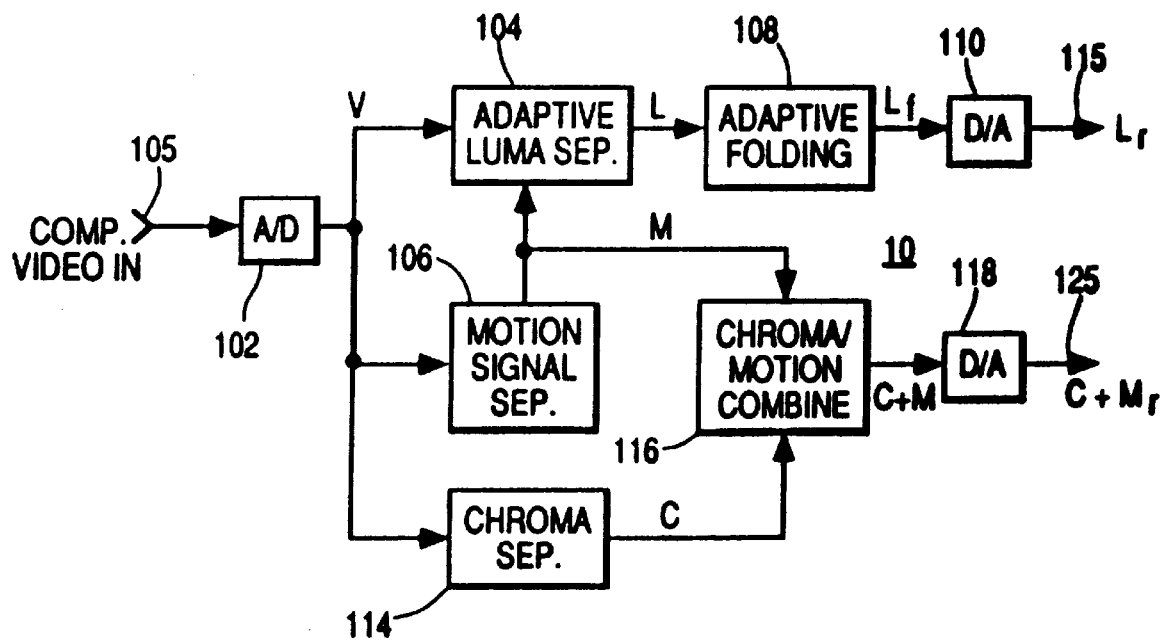
FIG. 2 is a block diagram of an encoder which may be a part of the record section of FIG. 1.

FIG. 2 is a more detailed block diagram of the encoder 10 illustrated in FIG. 1. In FIG. 2, an input terminal 105 is coupled to input terminal 5 (of FIG. 1). Input terminal 105 is coupled to an input terminal of an analog-to-digital converter (A/D) 102. An output terminal of A/D 102 is coupled to respective input terminals of an adaptive luminance signal separator 104, a motion signal separator 106 and a chrominance signal separator 114. An output terminal of the adaptive luminance signal separator 104 is coupled to an input terminal of an adaptive folding circuit 108. An output terminal of the adaptive folding circuit 108 is coupled to an input terminal of an digital-to-analog converter (D/A) 110. An output terminal of D/A 110 is coupled to a first output terminal 115. Output terminal 115 is coupled to the input terminal of the luminance record circuit 20 (of FIG. 1).

An output terminal of the motion signal separator 106 is coupled to a control input terminal of the adaptive luminance signal separator 104 and a motion signal input terminal of chrominance/motion signal combining circuit 116. An output terminal of the chrominance signal separator 114 is coupled to a chrominance signal input terminal of a chrominance/motion signal combining circuit 116 is coupled to an input terminal of a second digital-to-analog converter (D/A) 118. An output terminal of D/A 118 is coupled to an output terminal 125. Output terminal 125 is coupled to the input terminal of the chrominance record circuit 30 (of FIG. 1).

In operation, the encoder of FIG. 2 first converts the composite video signal at input terminal 105 to a sampled data multibit digital composite video signal V using A/D 102. The sampling frequency is selected in a manner more fully described below. For an NTSC signal, the sampling frequency may be selected to be about 10 MHz, for example. Signal V is supplied to the adaptive luminance separator 104, which extracts the luminance component L; to the motion signal separator 106, which extracts a motion representative signal M; and to a chrominance signal separator 114, which extracts the chrominance signal component.

The extracted luminance signal L is further processed by the adaptive folding circuit 10-8. This circuit folds attenuated high frequency components of the luminance signal L back into lower frequency components, and filters the resulting signal so that all the information in the full-bandwidth luminance signal L is contained in a folded luminance signal $L_f$ which has a bandwidth of about 2.5 MHz. The adaptive folding circuit 108 will be described in more detail below. The folded luminance signal $L_f$ is converted to an analog signal $L_r$ in D/A 110. This signal is in a form which can be recorded on a video cassette by luminance recording circuitry 20 (of FIG. 1).

The extracted motion signal M and the extracted chrominance signal C are combined into a single composite signal C+M in the chrominance/motion signal combining circuit 116. A chrominance/auxiliary signal combining circuit, which may be used as the chrominance/motion signal combining circuit 116 is described in more detail in the above-referenced patent application Ser. No. 07/531,070. The C+M signal is converted into an analog signal C+Rr by D/A 118. This signal is in a form which can be recorded on a video cassette by standard chrominance recording circuitry 30 (of FIG. 1).

As is known in the video signal processing art, frame comb low pass filters (temporal low pass filters) may be used to extract the luminance component with no loss of spatial resolution. However, in the presence of motion, artifacts are introduced into the frame comb extracted luminance signal. Line comb low pass filters (vertical comb low pass filters) may also be used to extract the luminance component, even in the presence of motion. However, luminance extracted by line combing has decreased diagonal resolution. It is preferable to extract the luminance signal using frame comb filtering, unless there is motion in an area of the image, in which case, it is preferable to use line comb filtering in that area.

Figure 3:
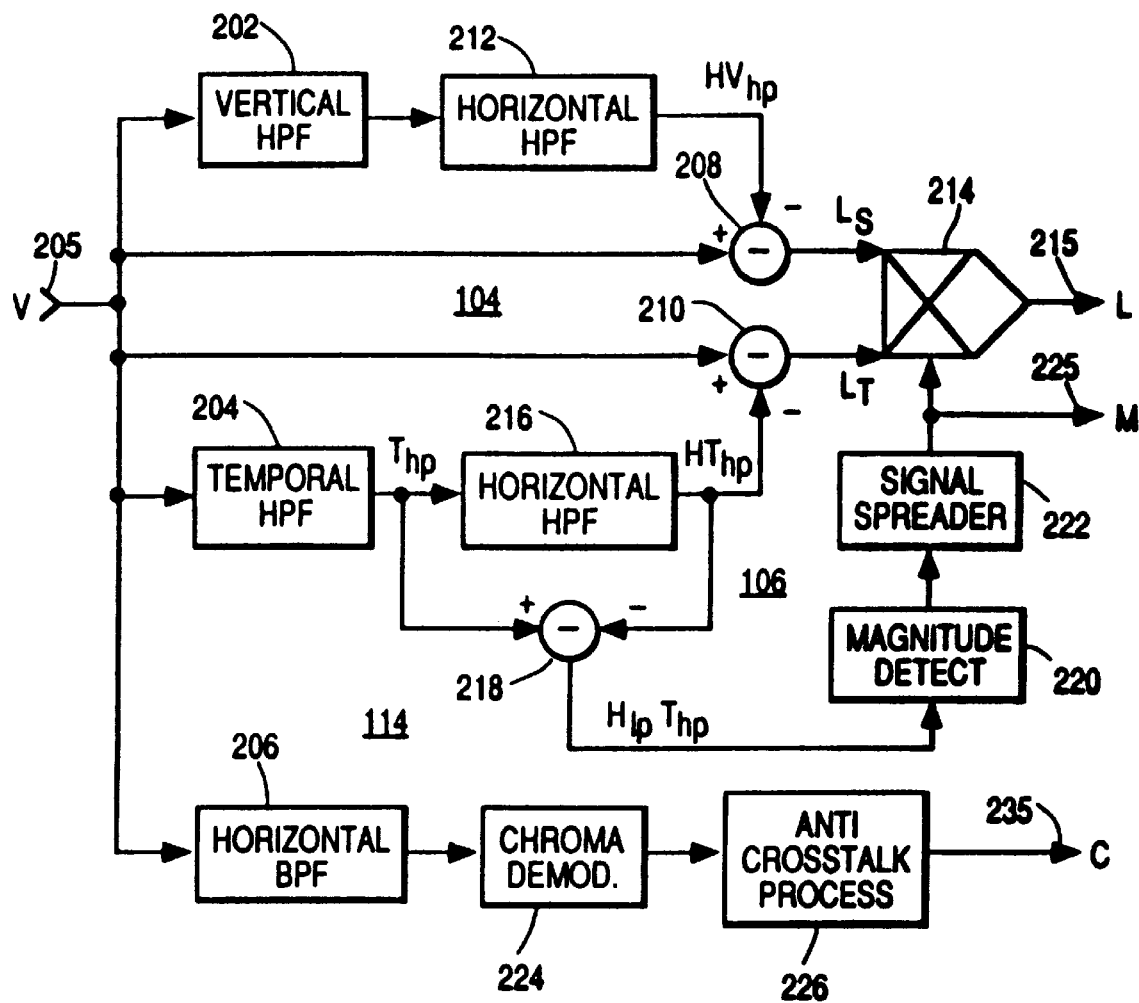
FIG. 3 is a more detailed block diagram of a portion of the encoder illustrated in FIG. 2.

FIG. 3 is a more detailed block diagram of a portion of encoder 10 illustrated in FIG. 2. In FIG. 3, an input terminal 205 is coupled to the output terminal of the A/D 102 (of FIG. 2). Input terminal 205 is coupled to respective input terminals of a vertical high pass filter (HPF) 202, a temporal high pass filter (HPF) 204, a horizontal band pass filter (BPF) 206 and to respective minuend input terminals of subtractors 208 and 210. An output terminal of the vertical HPF 202 is coupled to an input terminal of a horizontal high pass filter (HPF) 212. An output terminal of horizontal HPF 212 is coupled to a subtrahend input terminal of subtractor 208. An output terminal of subtractor 208 is coupled to a first data input terminal of a soft switch 214. An output terminal of soft switch 214 is coupled to an output terminal 215. Output terminal 215 is coupled to the input terminal of the adaptive folding circuit 108 (of FIG. 2).

An output terminal of temporal HPF 204 is coupled to an input terminal of a horizontal high pass filter (HPF) 216 and to a minuend input terminal of a subtractor 218. An output terminal of horizontal HPF 216 is coupled to respective subtrahend input terminals of subtractors 210 and 218. An output terminal of subtractor 210 is coupled to a second data input terminal of soft switch 214.

An output terminal of subtractor 218 is coupled to an input of a signal magnitude detector 220. An output terminal of magnitude detector 220 is coupled to an input terminal of signal spreader 222. An output terminal of signal spreader 222 is coupled to an output terminal 225 and to a control input terminal of soft switch 214. Output terminal 225 is coupled to the motion signal input terminal of chrominance/motion signal combining circuit 116 (of FIG. 2).

An output terminal of horizontal BPF 206 is coupled to an input terminal of a chrominance signal demodulator 224. An output terminal of chrominance signal demodulator 224 is coupled to an input terminal of an anti-crosstalk processor 226. An output terminal of anti-crosstalk processor 226 is coupled to an output terminal 235. Output terminal 235 is coupled to a chrominance signal input terminal of chrominance/motion signal combining circuit 116 (of FIG. 2).

In operation, horizontally and vertically high pass filtered signal $HV_{hp}$, produced by the cascaded vertical HPF 202 and horizontal HPF 212, contains all the chrominance information present in the composite video signal V in addition to all the spatial detail information. This information is subtracted from the composite video signal by subtractor 208, to produce a spatially derived luminance signal. The spatially derived luminance signal $L_S$, produced by subtractor 208, therefore, contains only luminance information, but has reduced diagonal resolution. Temporally and horizontally high pass filtered signal $HT_{hp}$, produced by the cascaded temporal HPF 204 and horizontal HPF 216, also contains all the chrominance information present in the composite video signal V, in addition to all the temporal detail information. This information is subtracted from the composite video signal by subtractor 210, to produce a temporally derived luminance signal $L_T$. The temporally derived luminance signal $L_T$, produced by subtractor 210, therefore, contains only luminance information at full spatial resolution, but has reduced temporal resolution.

The temporally high pass filtered signal $T_{hp}$ from the temporal HPF 204 contains motion information, at horizontal low frequencies and chrominance information at high luminance frequencies. Thus, the output signal from the horizontal HPF is subtracted from the temporally high pass filtered signal $T_{hp}$ to form a horizontal low pass filtered, temporally high pass filtered signal $H_{lp}T_{hp}$, which is a bipolar motion representative signal. This signal varies as a function of both the magnitude of the motion in the image (that is, the faster the motion, the larger the signal) and the contrast of the moving portion of the image. This signal has greatest magnitude at the edges of objects having large contrast with respect to the background against which it is moving. Where the background and moving object are close in intensity, the motion signal is weak. In addition, quick moving objects with soft edges also produce a weak motion signal. Finally, even with quick moving high contrast objects, the motion signal is usually only strong within several pixels of the moving edge.

In order to minimize the effect of these variations in the signal, magnitude detector 220 detects the magnitude of the motion signal from the subtractor 218 and produces a single bit signal indicating either the presence or absence of motion for that pixel. A known magnitude detector 220 may include a multiplexer having a control input terminal responsive to a sign bit of the applied motion signal. The motion signal $H_{lp}T_{hp}$ would be coupled to a first input terminal of the multiplexer and an input terminal of an arithmetic negator circuit. An output terminal of the arithmetic negator circuit would be coupled to a second input terminal of the multiplexer. The output terminal of the multiplexer produces the magnitude (absolute value) of the motion signal. If the sign bit is a logic '0', indicating, for example, that the motion signal value is positive, then the multiplexer couples the first input terminal, carrying the motion signal, to the output terminal. If the sign bit is a logic '1', indicating that the motion signal value is negative, then the multiplexer couples the second input terminal, carrying the arithmetic negative of the motion signal (which would be a positive valued signal) to the output terminal.

This magnitude signal is then supplied to a known comparator circuit. The comparator circuit compares the magnitude signal to a predetermined threshold value. If the magnitude signal exceeds the threshold value, then the comparator circuit produces an output signal which is a logic '1' signal. If the magnitude signal is less than the threshold value, then the comparator circuit produces an output signal which is a logic '0' signal, The output of this comparator is a single bit signal which is a logic '1' in the presence of motion, and a logic '0' otherwise.

This single bit motion signal is spread vertically and horizontally by signal spreader 222. Alternatively, the signal may be spread temporally, vertically and horizontally by signal spreader 222. Apparatus for spreading such single bit motion representative signal is described in U.S. Pat. No. 5,083,203. The spread motion signal M, produced by signal spreader 222, is a multibit digital signal whose value gradually decreases from a maximum value in moving areas (as indicated by the single-bit bi-level signal having a logic '1' value) to a zero valued signal in the area around the moving area in the vertical and horizontal directions (and optionally, temporally). This motion signal M is used by other portions of the encoder for adaptively processing the video signal V. As described above, in the absence of motion, the luminance signal L is preferably the temporally derived luminance signal $L_T$; but in the presence of motion, the luminance signal L is preferably the spatially derived luminance signal $L_S$. Soft switch 214 will continuously vary the proportion of the two input signals $L_T$ and $L_S$ in response to the value of the motion signal M. If the value of the motion signal M is zero, or nearly zero, indicating no or a low level of motion, then the soft switch produces an output signal L which is completely $L_T$. If the value of the motion signal M is at a maximum, or nearly maximum, indicating a high level of motion, then the soft switch 214 produces an output signal L which is completely $L_S$. At intermediate values of the motion signal M, the output signal contains some proportion of each of the input signals $L_T$ and $L_S$. The operation of soft switch 214 will be described in more detail below.

The modulated chrominance component C is extracted from the composite video signal V in a known manner using the horizontal BPF 206. The chrominance signal is demodulated to baseband by chrominance signal demodulator 224. The baseband chrominance signal is processed to reduce adjacent track crosstalk by an anti-crosstalk element 226. Anti-crosstalk element 226 may be, for example, a vertical low pass filter, which may be implemented as a two-tap line comb low pass filter.

Figure 4A:
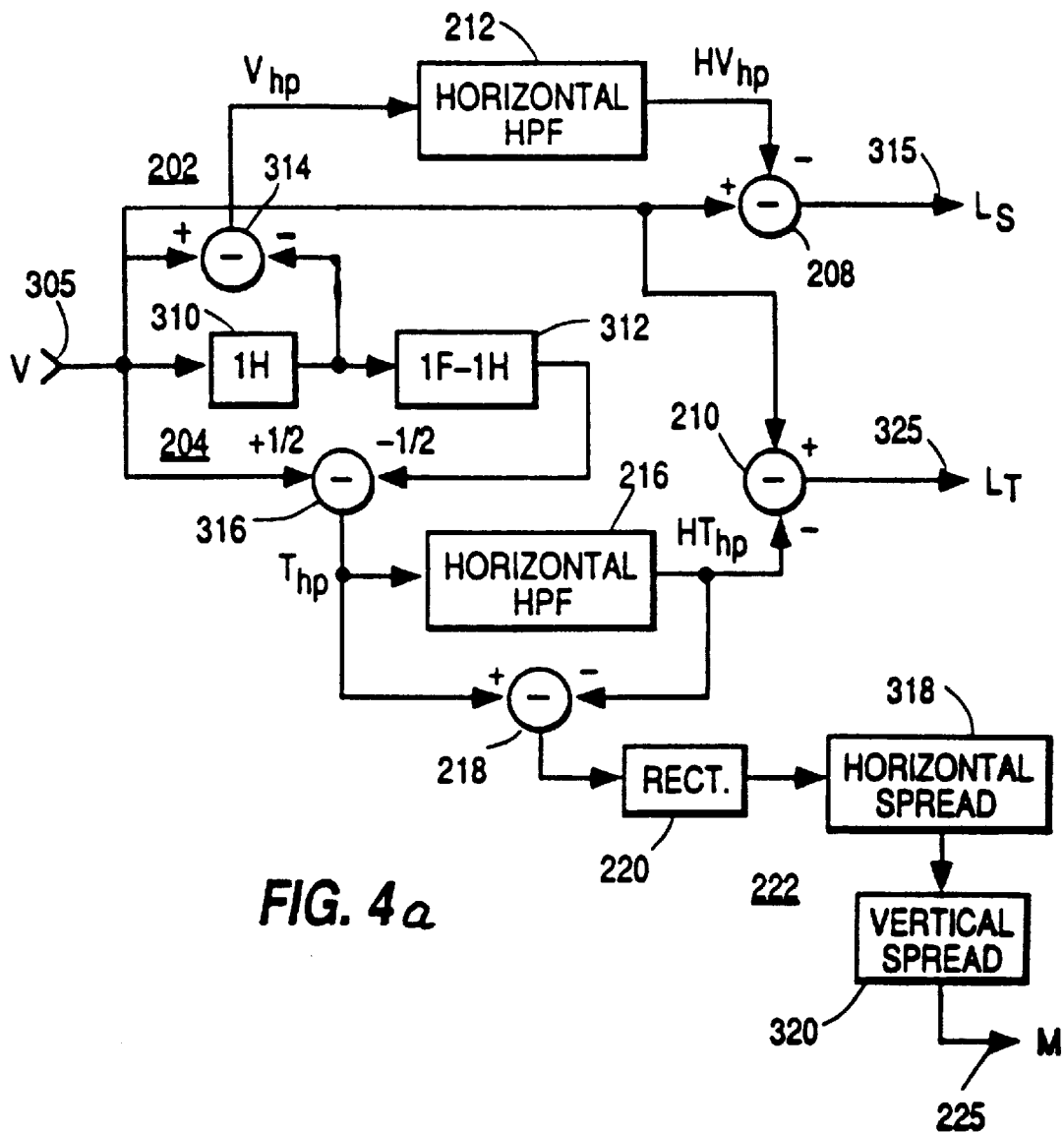
FIGS. 4a and 4b are more block diagrams of a portion of the encoder illustrated in FIG. 3.
Figure 4B:
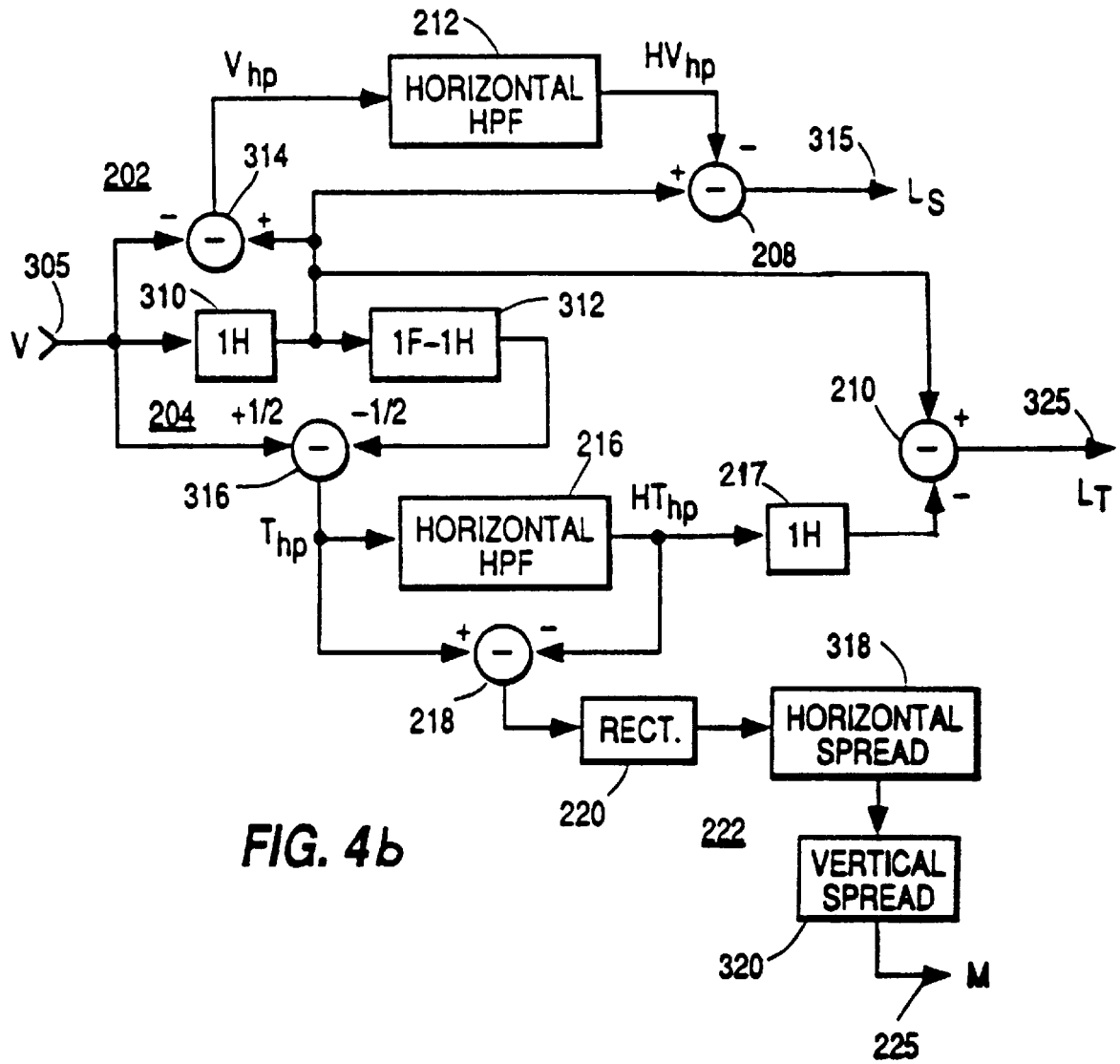

In FIG. 3, the vertical HPF 200 and temporal HPF 204 are both responsive to the composite video signal V. Because they are implemented as comb filters, they can share delay lines. FIGS. 4a and 4b are more detailed block diagrams illustrating the apparatus of FIG. 3 in a more efficiently constructed form, sharing delay lines, whenever possible. FIG. 3 illustrates a portion of encoder 10 which is preliminary applicable for processing an NTSC video signal. One skilled in the art would understand how to construct an encoder 10 in accordance with principles of the present invention for processing as PAL video signal, a SECAM video signal or a video signal according to any other standard. FIG. 4a elements which are the same as those in FIG. 3 have the same reference number and are not described in detail below.

In FIGS. 4a and 4b an input terminal 305, is coupled to the output terminal of A/D 102 (of FIG. 2). In FIG. 4a, input terminal 305 is coupled to a minuend input terminal of a subtractor 208, a minuend input terminal of a subtractor 210, a minuend input terminal of a subtractor 314, a minuend input terminal of a weighted subtractor 316 whose input is weighted by ½, and an input terminal of cascaded delay devices 310 and 312. Delay device 310 produces a signal at its output terminal which is the signal at its input terminal delayed by a period of time equal to one horizontal scan period (IH). Delay device 312 produces a signal at its output terminal which is the signal at its input terminal delayed by a period of time eual to one frame scan period less one horizontal scan period (IF-IH). An output terminal of IF-IH delay device 312 is coupled to a subtrahend input terminal of weighted subtractor 316, whose input is weighted –½. The combination of delay devices 310 and 312 and weighted subtractor 318 forms temporal HPF 204 as a two-tap frame high pass comb filter of known design producing signal $T_{hp}$.

An output terminal of IH delay device 310 is coupled to a subtrahend input terminal of subtractor 314. The combination of IH delay device 310 and subtractor 314 forms vertical HPF 202 as a two tap line comb filter of known design producing signal $V_{hp}$.

An output terminal of subtractor 218 is coupled to serially coupled rectifier 220, horizontal spreader 318 and vertical spreader 320. The combination of rectifier 220, horizontal spreader 318 and vertical spreader 320 forms signal spreader 222 (of FIG. 3) and operates as described above.

The remainder of FIG. 4a is the same as illustrated in a portion of FIG. 3 and described above except that FIG. 3 does not purport to show timing accuracy. The horizontal HPFs 212 and 216 may be a standard digital high pass filters each having a break frequency at around 2 MHz. A 15-tap horizontal comb high pass filter is preferred, yielding a response characteristic which is –6 dB at 1.75 MHz.

FIG. 4b illustrates another more detailed block diagram of the apparatus illustrated in FIG. 3. In FIG. 4b, elements which are similar to those in FIG. 4a have the same reference number, and are not described in detail below.

In FIG. 4b, input terminal 305 is coupled to a subtrahend input terminal of a subtractor 314, a minuend input terminal of a weighted subtractor 316 whose input is weighted by ½ and an output terminal of cascaded IH delay is coupled to a device 310 and IF-IH delay device 312. An output terminal of IH delay is coupled to a minuend input terminal of subtractor 314, a minuend input terminal of a subtractor 208 and a minuend input terminal of a subtractor 210. The combination of IH delay device 310 and subtractor 314 forms vertical HPF 202 as a two tap line comb filter of known design producing signal Vhp.

An input terminal of IF-IH delay device 312 is coupled to a subtrahend output terminal of weighted subtractor 316 whose input is weighted by ½. The combination of delay devices 310 and 312 and weighted subtractor 316 forms temporal HPF 204 as a two tap frame high pass comb filter of known design producing signal $T_{hp}$.

An output terminal of weighted subtractor 316 is coupled to an input terminal of a horizontal HPF 216 and a minuend input terminal of a subtractor 218. An output terminal of horizontal HPF 216 is coupled to an input terminal of a second IH delay device 217 an a subtrahend input terminal of subtractor 218. An output terminal of IH delay device 217 is coupled to a subtrahend input terminal of subtractor 210. The remainder of FIG. 4b is the same as illustrated in FIGS. 3 and 4a.

In operation, the embodiment of FIG. 4b differs form that of FIG. 4a in the timing. In FIG. 4a, the pixel at the input terminal 305 may be considered as the 'current pixel'. The current pixel is the pixel from which is subtracted, in subtractors 208 and 210, the spatially and temporally high pass filtered pixels from horizontal HPF 212 and horizontal HPF 216, to form the spatially and temporally low pass filtered pixel signals $L_S$ and $L_T$, respectively. In addition, the current pixel is the pixel from which is subtracted the pixel displaced in time by the IH delay device 310 to form the vertical high pass filtered pixel signal Vhp.

In FIG. 4b, however, the current pixel is taken from the output terminal of IH delay device 310. It is this pixel from which is subtracted the spatially and temporally high pass filtered pixels, from horizontal HPF 212 and horizontal HPF 216, to form the spatially and temporally low pass filtered pixel signal $L_S$ and $L_T$ respectively. In order to equalize the delay introduced by IH delay device 310 to the current pixel, the IH delay device 217 is included in the signal path of the temporally high pass filtered signal HThp from horizontal HPF 216. In addition, the current pixel is the pixel from which is subtracted the pixel displaced in time by the IH delay device 310 to form the vertical high pass filtered pixel signal $V_{hp}$.

Figure 5:
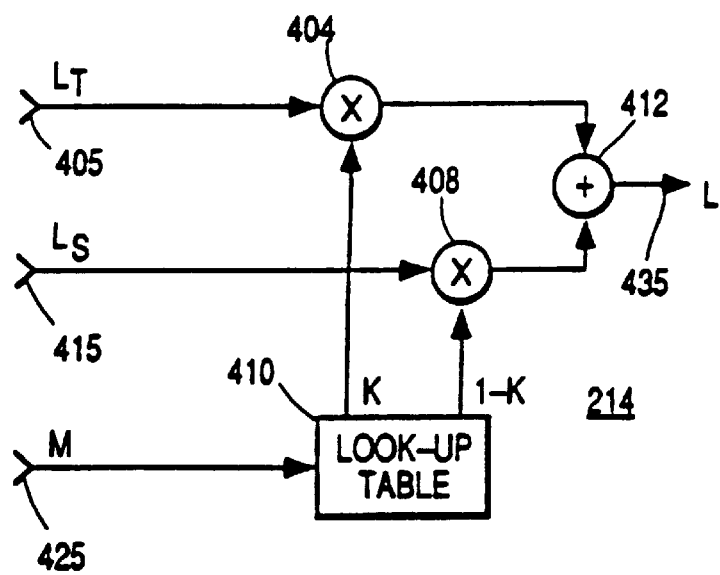
FIG. 5 is a more detailed block diagram of a portion of the encoder illustrated in FIG. 2.

FIG. 5 is a more detailed block diagram of the soft switch 214 illustrated in FIG. 3. In FIG. 5, an input terminal 405 is coupled to the output terminal of subtractor 210 (of FIG. 3). Input terminal 405 is coupled to a first input terminal of a multiplier 404. An output terminal of multiplier 404 is coupled to a first input terminal of an adder 412. An output terminal of adder 412 is coupled to an output terminal 435. Output terminal is coupled to the adaptive folding circuit 108 (of FIG. 2).

An input terminal 415 is coupled to an output terminal of subtractor 208 (of FIG. 3). Input terminal 415 is coupled to a first input terminal of a multiplier 408. An output terminal of multiplier 408 is coupled to a second input terminal of adder 412. An input terminal 425 is coupled to an output terminal of signal spreader 222 (of FIG. 3). Input terminal 425 is coupled to an input terminal of look-up table 410. A first output terminal of look-up table 410 is coupled to a second input terminal of multiplier 404, and a second output terminal of look-up table 410 is coupled to a second input terminal of multiplier 408.

In operation, multiplier 404 scales the temporally derived luminance signal $L_T$ by the scaling factor K, and multiplier 408 scales the spatially derived luminance signal $L_S$ by the scaling factor 1−K. Adder 412 sums the two scaled signals to produce the luminance signal L.

The spread motion signal M from input terminal 425 is applied to the input of look-up table 410. Look-up table produces two scaling factors which are related to the value of the control signal M. The first scaling factor K is the proportion of the temporally derived luminance signal $L_T$ which should be in the luminance output signal L. The second scaling factor 1−K is the proportion of the spatially derived luminance signal L which should be in the luminance output signal L. The sum of K and 1−K is one. The function K(M) is selected such that when M is zero or nearly zero (low level of motion), K is one (all temporally derived luminance) and 1−K is zero (no spatially derived luminance); and when M is maximum or nearly maximum (high level of motion), K is zero (no temporally derived luminance) and 1−K is one (all spatially derived luminance). The function K(M) is continuous and may be linear or non-linear. As the value of the motion signal M gradually changes from zero to maximum, the proportion of the temporally derived luminance signal $L_T$ gradually decreases and the proportion of the spatially derived luminance signal $L_S$ gradually increases.

Look-up table 410 may be implemented in known manner as a multibit read-only memory (ROM) having input terminal 425 coupled to its address input terminals. A first subset of its data output terminals are coupled to the K signal input terminal of multiplier 404, and a first subset are coupled to the 1−K signal input terminal of multiplier 408.

In operation, the storage locations of the ROM are accessed by the motion signal M at the address input terminals where each separate value which the M signal can assume accesses a different storage location. Each storage location has a first portion (which is coupled to the second subset of data output terminals) preprogrammed with the K value corresponding to the M value which accesses that location, and a second portion (which is coupled to the second subset of data output terminals) preprogrammed with the 1−K value corresponding to that value of the motion signal M.

Figure 6:
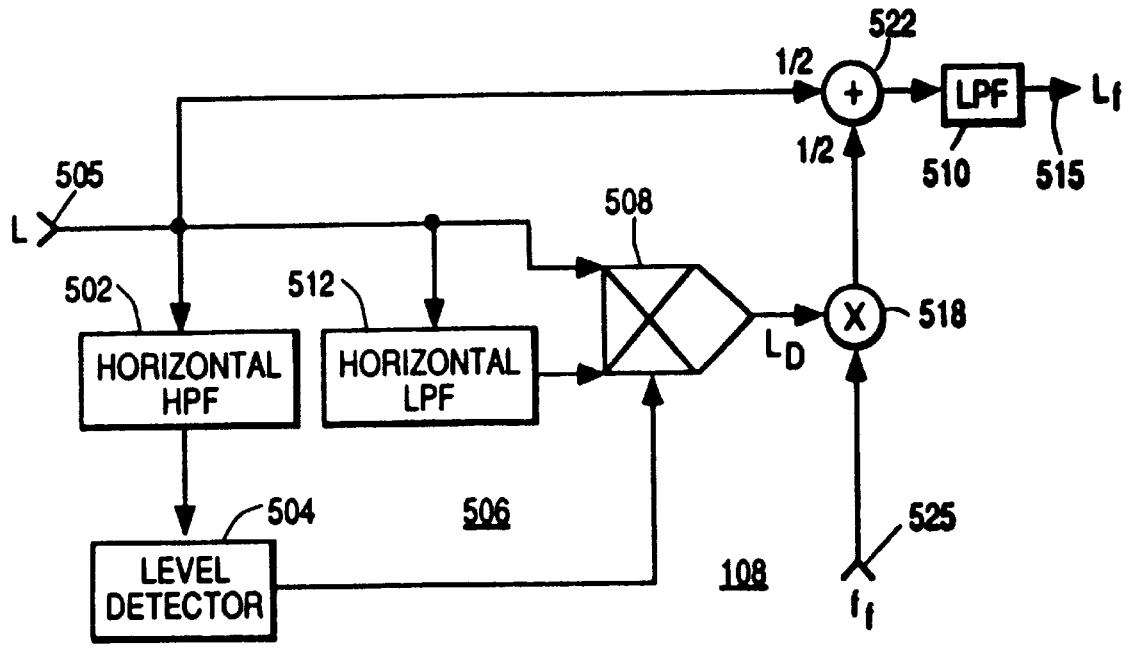
FIG. 6 is a block diagram of an adaptive folding circuit which is a part of the encoder of FIG. 2.

FIG. 6 is a block diagram of the adaptive folding circuit 108 as illustrated in FIG. 2. In FIG. 6, an input terminal 505 is coupled to the output terminal of the adaptive luminance separator 104 (of FIG. 2). Input terminal 505 is coupled to an input terminal of a horizontal high pass filter (HPF) 502, an input terminal of a horizontal low pass filter (LPF) 512, a first input terminal of a weighted adder 522 whose input signal is weighted by ½ and a first data input terminal of a soft switch 508. An output terminal of the soft switch 508 is coupled to a data input terminal of a modulator 518. An output terminal of the modulator 518 is coupled to a second input terminal of weighted adder 522 whose input signal is weighted by ½. An output terminal of the weighted adder 522 is coupled to an input terminal of low pass filter (LPF) 510. An output terminal of LPF 510 is coupled to output terminal 515. Output terminal 515 is coupled to D/A 110 (of FIG. 2).

An output terminal of horizontal HPF 502 is coupled to an input terminal of level detector 504. An output terminal of level detector 504 is coupled to a control input terminal of the soft switch 508. An output terminal of the horizontal LPF 512 is coupled to a second data input terminal of the soft switch 508.

An input terminal 525 is coupled to a source (not shown) of a folding carrier signal having a frequency $f_f$. Input terminal 525 is coupled to a clock signal input terminal of the modulator 518.

As described above, in prior-art luminance signal folding systems, the luminance high frequencies are folded back into the luminance low frequencies at the same amplitude or higher. When folded luminance signals with relatively large amounts of high-spatial-frequency moving detail are played back on a conventional VCR, which has no provision for removing these folded high luminance frequencies, objectionable artifacts are present in reproduced images, the inventor and his co-workers found. Accordingly, in preferred embodiments of the invention, high-spatial-frequency detail is adaptively de-emphasised in the folding procedure carried out during recording, to reduce the amplitude of reversed-spectrum high-spatial-frequency components vis-a-vis the normal-spectrum low-spatial-frequency components with which they interleave. During playback the de-emphasized reversed-spectrum high-spatial-frequency components are re-emphasized to original strength vis-a-vis the normal-spectrum low-spatial-frequency components.

The combination of the horizontal HPF 502, level detector 504, horizontal LPF 512 and soft switch 508 forms an adaptive depeaker 506 which is inserted into the folding circuitry to reduce the amplitude of the luminance high frequencies prior to their being mixed with a folding carrier signal by a multiplier 518. The reduction is to a level such that, if reproduced on a VCR which has no provision for removing them, the artifacts do not produce an unacceptable image. The adaptive depeaker 506 produces a depeaked luminance signal LD.

The adaptive depeaker operates in the following manner. Horizontal HPF 502 extracts the high frequency luminance component. The level of the luminance high frequencies is detected in the level detector 504. The level detector 504 operates in a known manner as an envelope detector to produce a signal which has the value of the maximum amplitude of the high frequency luminance signal.

Soft switch 508 may be constructed in the same manner as soft switch 214 (of FIG. 3), including multipliers for scaling each data signal, an adder for summing the scaled data signals, and a look-up table for generating the scaling factors in response to the control signal.

The horizontal LPF 512 produces a signal in which the luminance high frequencies are attenuated relative to the luminance low frequencies. When the level of luminance high frequencies, as detected by level detector 504, is zero or nearly zero, then the high frequencies do not need to be attenuated, and the output signal LD from soft switch 508 is completely from input terminal 505 carrying the unfiltered luminance signal L. As the level of luminance high frequencies increases, the luminance high frequencies need to be attenuated. In this situation, the proportion of unfiltered luminance signal L decreases in the output signal LD from the soft switch 508 and the proportion of low pass filtered luminance signal increases. When the level of luminance high frequencies is maximum or nearly maximum, then the high frequencies need to be attenuated to the maximum extent and the output signal LD from soft switch 508 is completely from the horizontal LPF 512. The values of K and 1–K (as illustrated in FIG. 5, and discussed in the corresponding text) are selected to perform the above described depeaking operation.

Then, in the modulator 518, depeaked luminance signal LD is used to modulate a folding carrier signal having a frequency $f_f$. The folding frequency is selected so as to maximize the distance between the folding carrier and the baseband luminance signal in the temporal, vertical and horizontal directions. The folding carrier is preferably placed at one-half the maximum vertical frequency, and one-half the maximum temporal frequency (i.e. in the so-called Fukinuki hole) in the temporal and vertical dimensions, and at about 5 MHz in the horizontal dimension. This maximizes the spectral distance between the folding carrier and the vertical and temporal lower frequency components of the luminance signal. The phase of the folding carrier must change from field to field, repeating the cycle every two frames. It is necessary properly to synchronize the unfolding done during playback with the folding done during recording and this is done by including frame identification information in the signal used to record the video tape. U.S. Pat. No. 5,532,820 describes in detail circuitry for generating the folding carrier $f_f$ in four phases, circuitry for inserting the frame identification information into selected scan lines within the vertical retrace intervals, and circuitry for generating the unfolding carrier $f_{uf}$ in four phases as synchronized by detecting the frame identification information inserted into selected scan lines within the vertical retrace intervals.

The modulator 518 may be a standard four quadrant multiplier, or, if the sampling frequency is properly selected, a +1,–1 type modulator. A +1,–1 type modulator modulates a sampled signal by a frequency equal to one-half the sampling frequency by arithmetically negating every other sample. For example, if the sampling frequency is selected to be at about 10 MHz, then the folding frequency will be about 5 MHz, with the actual frequency selected so as to satisfy the above criteria relating to vertical and temporal spectral distance from vertical and temporal DC. The output signal contains a component of one-half the sampling frequency, and upper and lower sidebands centered around one-half the sampling frequency containing the spectral information contained in the input signal.

Such a modulator, having data input and output terminals and a clock input terminal, may be constructed using a multiplexer having a first data input terminal coupled to the data input terminal of the modulator. An arithmetic negator is also coupled to the data input terminal of the modulator. An output terminal of the arithmetic negator is coupled to a second data input terminal of the multiplexer. An output terminal of the multiplexer is coupled to the output terminal of the modulator. A folding clock signal, which has a frequency equal to one-half the sampling clock frequency, is coupled to the clock input terminal of the modulator, which is coupled to the control input terminal of the multiplexer. This signal alternates between a logic '1' value and a logic '0' value at the sampling frequency, and may be generated by a flip-flop coupled to the sampling clock signal.

In operation, when the folding clock signal is a logic '1' signal, then the multiplexer couples the non-negated signal from the input terminal of the modulator to its output terminal. When the folding clock signal is a logic '0' signal, then the multiplexer couples the negated signal from the arithmetic negator to its output terminal. In this fashion, a modulated signal is reproduced. The lower sideband of the modulated signal contains a spectral image of the 4.2 MHz bandwidth depeaked luminance signal but inverted in frequency. That is, the depeaked luminance signal is folded about the folding frequency—low depeaked baseband luminance frequencies are folded into the neighborhood of 5 MHz, and high depeaked baseband luminance frequencies of 4.2 MHz, for example, are folded into the neighborhood of 800 kHz.

The folded depeaked luminance signal is then combined with the baseband luminance signal in weighted adder 522. This composite signal is then low pass filtered by LPF 510, which is preferably a finite-impulse-response (FIR) filter that exhibits an amplitude attenuation characteristic that is substantially anti-symmetrical with respect to said folding frequency and so provides a passband narrow enough to eliminate all of the signal which would not pass through the narrow-band channel. For a VCR, the passband of LPF 510, being substantially half the frequency of the folding carrier signal of about 5 MHz, is about 2.5 MHz.

The LPF 510 is preferably an FIR digital low pass filter, so as to provide the linear delay characteristic desired at the cross-over frequency of the luminance signal when it is unfolded. In an FIR digital filter the linear delay characteristic continues through the passband, through the cut-off region, and into the stop band. This contrasts with analog low pass filters as employed by Howson and Bell or by Faroudja where a linear delay characteristic is obtainable through most of the passband, but is not obtainable through the cut-off region and into the stop band.

The horizontal LPF 512 is FIR, so as to provide a linear delay characteristic, which facilitates subsequent re-emphasis during playback. The horizontal HPF 502 and horizontal LPF 512 are both responsive to the same luminance signal L and may share delay line elements in the same manner as the filters 202 and 204 share common delay line elements, as illustrated in FIGS. 4a and 4b. One skilled in the art of video signal processor design would understand how to design such filters sharing delay line elements.

Figure 7:
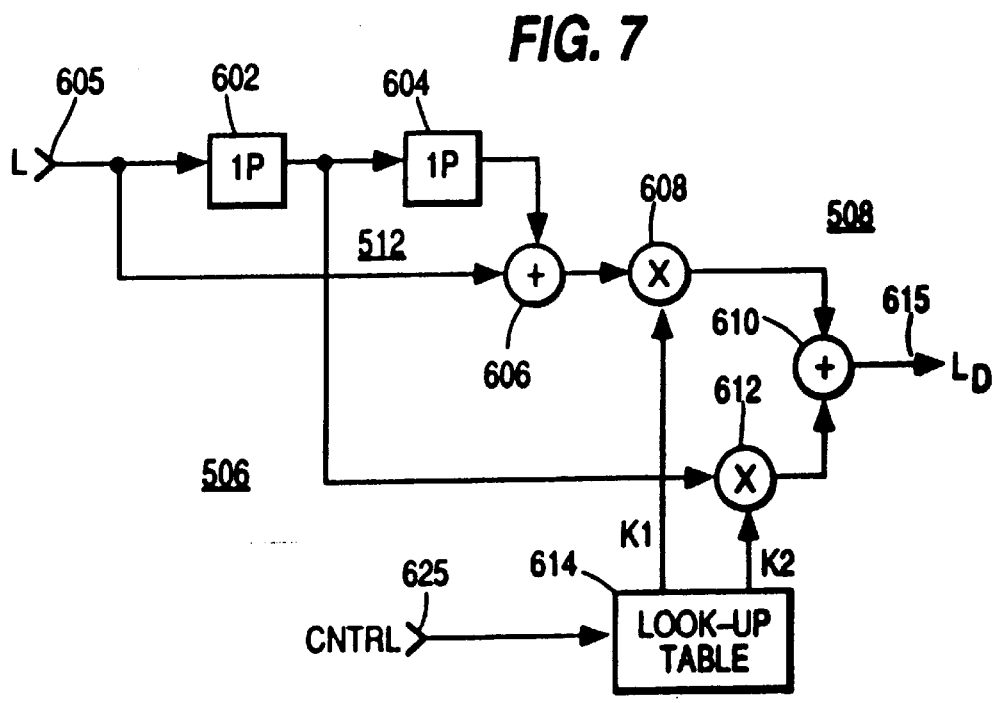
FIG. 7 is an alternative embodiment of a portion of the adaptive folding system illustrated in FIG. 6.

FIG. 7 is an alternative embodiment of a portion of the adaptive depeaker 506 illustrated in FIG. 6. In FIG. 7, an input terminal 605 is coupled to the output terminal of the adaptive luminance signal separator 104 (of FIG. 2). Input terminal 605 is coupled to a first input terminal of an adder 606 and an input terminal of cascaded single pixel period (IP) delay devices 602 and 604. An output terminal of IP delay device 602 is coupled to a first input terminal of a multiplier 612. An output terminal of multiplier 612 is coupled to a first input terminal of an adder 610. An output terminal of adder 610 is coupled to an output terminal 615. Output terminal 615 is coupled to the input terminal of the modulator 518 (of FIG. 6).

An output terminal of IP delay device 604 is coupled to a second input terminal of adder 606. An output terminal of adder 606 is coupled to a first input terminal of multiplier 608. An output terminal of multiplier 608 is coupled to a second input terminal of adder 610.

An input terminal 625 is coupled to the output terminal of level detector 504 (of FIG. 6). Input terminal 625 is coupled of an input terminal of a look-up table 614 (which may also be implemented in a ROM, as described above). First and second output terminals of look-up table 614 are coupled to respective second input terminals of multiplier 608 and 612.

The operation of the portion of the depeaker 506 illustrated in FIG. 7 differs from that illustrated in FIG. 6 in the cooperation between the soft switch 508 and the horizontal LPF 512. In a depeaker, the level of the high frequencies in the input signal is lowered in the output signal. In the embodiment illustrated in FIG. 6, this is done by varying the proportion of low pass filtered luminance signal and unfiltered luminance signal in the output signal LD. In FIG. 7, the horizontal LPF 512 and the soft switch 508 share adders 606 and 610.

In a standard three tap low pass comb filter, the input and output taps of the cascaded delay devices each receive a weight of ¼, and the center tap receives a weight of ½ before they are added together to generate the low pass filtered signal. In the case of a depeaker, some proportion of the center tap signal, representing the unfiltered input signal, suitably delayed for combination with the low pass filtered signal, is added to the low pass filtered signal. These two operations may be performed by the same scaling and combining elements.

Adder 606 sums the input and output taps of the serially coupled delay devices. (It makes no difference whether each of the input and output taps are weighted by ¼ then they are summed, or the input and output taps are slummed then the sum is weighted by ¼). This sum is then weighted by the multiplier 608, which receives weighting factor K1 from the look-up table 614. The center tap is weighted by multiplier 612, which receives weighting factor K2 from the look-up table 614. These weighting factors are not related by K2 being equal to 1−K1, as in the soft switch illustrated in FIG. 5.

Instead, when a zero or low level of luminance high frequencies is detected by level detector 504 (of FIG. 6), then the unfiltered luminance signal is desired. In this case scaling factor K1 is zero and scaling factor K2 is one. The sum of the scaled signals is produced by adder 610, which, in this case, is the unfiltered luminance signal L. When a maximum or nearly maximum level of luminance high frequencies is detected by level detector 504, then the low pass filtered luminance signal is desired. In this case scaling factor K1 is ¼ and scaling factor K2 is ½. As the level of luminance high frequencies gradually increases from zero to maximum, scaling factor K1 changes in a continuous manner from one to ½, and scaling factor K2 changes in a continuous manner from zero to ¼. In this manner, the output signal of the adaptive peaker has the proportions of unfiltered and low pass filtered luminance signals gradually varied in a continuous manner in response to the level of luminance high frequencies.

In the above description, the response characteristic of the three tap low pass comb filter was a simple raised cosine. Different weighting factors could be preprogrammed into a ROM implementation of the look-up table 614 to implement different response characteristics for the low pass comb filter 512. In addition, the widths of the deadbands at the zero and maximum luminance high frequency levels, and the characteristic of the continuous change in proportions of the unfiltered and low pass filtered luminance signal in response to the level of luminance high frequencies may be varied.

The apparatus described above may be used to record a full-bandwidth video signal on a standard video cassette, which may then be played back on a standard VCR, without objectionable artifacts. Apparatus described below may be used for extracting the luminance high frequencies folded into the luminance low frequencies and regenerating the full bandwidth video signal upon playback of such a previously recorded video cassette.

FIG. 8 is a block diagram of a playback system in accordance with the present invention. In FIG. 8, a playback head 50 is incorporated in a standard tape transport (not shown) of a standard VCR. Playback head 50 is coupled to respective input terminals of a luminance signal playback circuit 60 and a chrominance signal playback circuit 80. An output terminal of luminance signal playback circuit 60 is coupled to a first input terminal of a decoder 70, and an output terminal of chrominance signal playback circuit 80 is coupled to a second input terminal of decoder 70. An output terminal of decoder 70 is coupled to an output terminal 15. Output terminal 15 is coupled to utilization circuitry (not shown) which may be, for example, a television receiver for reproducing the images previously recorded on the video cassette, or a Y-C output jack such as is in a super-VHS VCR.

In operation, playback head 50 supplies its signal to both the luminance playback circuit 60 and the chrominance playback circuit 80, in the known manner. The previously recorded folded luminance signal occupies a band of frequencies at about 1.4–5.9 MHz, and previously recorded chrominance plus motion signal occupies a 1 MHz band of frequencies at around 629 kHz. The luminance playback circuitry processes the folded luminance signal in the usual manner, demodulating the frequency-modulated luminance carrier to produce the playback folded luminance signal $L_{pb}$. The chrominance playback circuitry processes the chrominance plus motion signal to produce the playback chrominance plus motion signal $C+M_{pb}$. These signals are then processed by the decoder 70 which extracts the motion signal from the chrominance signal, and uses it to aid in unfolding the folded high frequency luminance component and reconstructing the full bandwidth luminance signal. The reconstructed full bandwidth luminance signal and the chrominance signals are then combined to form a composite video signal at output terminal 15.

FIG. 9 is a more detailed. block diagram of the decoder 70 illustrated in FIG. 8. In FIG. 9, an input terminal 805 is coupled to the output terminal of luminance playback circuit 60 (of FIG. 8). Input terminal 805 is coupled to an input terminal of a clamping circuit 802. An output terminal of clamping circuit 802 is coupled to an input terminal of an analog-to-digital converter (A/D) 804. An output terminal of A/D 804 is coupled to an input terminal of time base corrector (TBC) 806. An output terminal of TBC 806 is coupled to a data input terminal of an adaptive unfolding circuit 808. An output terminal of adaptive unfolding circuit 808 is coupled to a first input terminal of composite video signal generator 810. An output terminal of composite video signal generator 810 is coupled to an output terminal 815. Output terminal 815 is coupled to utilization circuitry (not shown) which, for example, may be a television receiver for reproducing the images which were previously recorded on the cassette or a Y-C output jack.

An input terminal 825 is coupled to the output terminal of the chrominance playback circuit 80 (of FIG. 8). Input terminal 825 is coupled to an input terminal of a clamping circuit 812. An output terminal of clamping circuit 812 is coupled to an input terminal of an analog-to-digital converter (A/D) 814. An output terminal of A/D 814 is coupled to an input terminal of a time base corrector (TBC) 816. An output terminal of TBC 816 is coupled to an input terminal of a chrominance/motion signal separator 818. A first output terminal of the chrominance/motion signal separator 818 is coupled to a second input terminal of the composite video signal generator 810. A second output terminal of the chrominance/motion signal separator 818 is coupled to a control input terminal of the adaptive unfolding circuit 808.

In operation, the upper elements in FIG. 9 operate to extract the full-bandwidth luminance signal from the reduced bandwidth luminance signal previously recorded on the cassette. Clamp 802 operates in a known manner to clamp the black level of the recovered luminance signal to a predetermined digital value in the A/D 804. For example, the black level could be clamped to a digital signal of 16, for an A/D which has the dynamic range of from 0 to 255. A/D 804 produces a sampled multibit digital signal representing the playback folded luminance signal. The TBC 806 operates to correct any timing inaccuracies which are introduced by jitter in the tape mechanism or any other source of timing inaccuracy, and produces the recovered folded luminance signal $L_f^*$ (where * indicates a playback signal representing the same signal as previously recorded on the cassette).

The lower elements in FIG. 9 operate the extract the chrominance plus motion signal previously recorded on the cassette. The chrominance plus motion signal is a bidirectional signal, so the zero voltage of this signal is clamped to a digital signal of 128 out of 255 in clamping circuit 812. The A/D 814 produces a sampled multibit digital signal representing the chrominance plus motion signal and the TBC 816 operates to correct any timing inaccuracies in this signal, and produces the recovered chrominance plus motion signal C+M*.

When recorded, the chrominance signal and the luminance were in phase synchronism. However, they are passed through two separate independent paths in the record circuitry (illustrated in FIG. 1) and are frequency division multiplexed on the cassette. This separate processing may introduce phase inaccuracies between the two signals which are not compensated for in the two separate TBCs 806 and 816. U.S. Pat. No. 5,083,197 describes in detail apparatus for restoring the proper phase relationship between the chrominance and luminance signals.

Chrominance/motion separator 818 processes the recovered chrominance plus motion signal c+m* to produce a recovered motion signal M*, which is supplied to the control input terminal of the adaptive unfolding circuit 808, and chrominance signal C*, which is supplied to the chrominance signal input terminal of the composite video signal generator 810. U.S. Pat. No. 5,083,203 describes in detail a chrominance/auxiliary signal separator which may be used as chrominance/motion signal separator 818, and this circuit will not be described in more detail here.

The adaptive unfolding circuit 808 unfolds the luminance high frequencies which were previously folded into the luminance low frequencies, and restores the full bandwidth luminance signal L*. This full bandwidth signal L* is supplied to the luminance signal input terminal of the composite video signal generator 810. Composite video signal generator 810 operates in a known manner to combine the luminance signal L* and chrominance signal C* to form a standard composite video signal. This signal may be used by any equipment which utilizes such a signal, for example, a television receiver.

Figure 10:
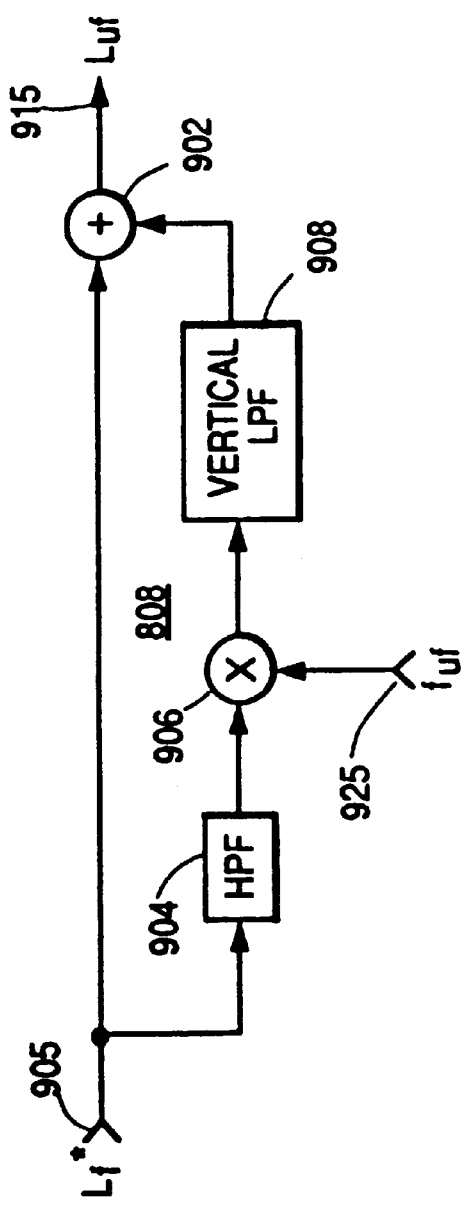
FIG. 10 is a more detailed block diagram of a portion of an adaptive unfolding circuit illustrated in FIG. 9.

FIG. 10 is a more detailed block diagram of a portion of an adaptive unfolding circuit 808 as illustrated in FIG. 9. In FIG. 10, an input terminal 905 is coupled to an output terminal of the time base corrector 806 (of FIG. 9). Input terminal 905 is coupled to an input terminal of a high pass filter (HPF) 904 and a first input terminal of an adder 902. An output terminal of adder 902 is coupled to an output terminal 915. Output terminal 915 produces the unfolded luminance signal $L_{uf}$, which is supplied to the remainder of the adaptive unfolding circuit illustrated in FIG. 11 (below).

An output terminal of HPF 904 is coupled to an input terminal of a modulator 906. An output terminal of modulator 906 is coupled to an input terminal of a vertical low pass filter (LPF) 908. An output terminal of vertical LPF 908 is coupled to a second input terminal of adder 902. An input terminal 925 is coupled to a source (not shown) of an unfolding carrier signal $f_{uf}$. Input terminal 925 is coupled to a second input terminal of the modulator 906.

In operation, input signal $L_f^*$ is the limited bandwidth folded luminance signal. The horizontal HPF 904 filters out the frequencies below the folded luminance signal containing the chrominance information. When the sideband luminance signal is folded around the folding carrier at about 5 MHz by the record circuitry, the highest frequency luminance signal, at about 4.2 MHz is folded to about 800 kHz. Thus, the break frequency of the horizontal HPF 904 is preferably about 750 kHz. The modulator 906 then unfolds the high pass filtered signal supplied from the horizontal HPF 904, unfolding it around the unfolding frequency which is about 5 MHz (where the actual frequency is selected in accordance with the criteria described above in the description of the modulator 518 of FIG. 6). As is the case with the modulator 518 (of FIG. 6), modulator 906 may be constructed in a known manner using a four quadrant multiplier. Or, the modulator 518 may be a +1,−1 type modulator using a clock signal at one half the sampling frequency, which in this example may be at about 10 MHz.

The demodulated signal from modulator 906 is then filtered by the vertical LPF 908. The processing performed by vertical LPF 908 may also be described as averaging, which increases the signal-to-noise ratio of the resulting signal. This signal is added to the received folded luminance signal $L_f^*$ from input terminal 905 in adder 902. The resulting unfolded signal $L_{uf}$ consists of a full bandwidth unfolded luminance signal centered around temporal, vertical and horizontal DC, and an image of the full bandwidth luminance signal centered about the unfolding carrier which has frequency at one-half the maximum temporal frequency, one-half the maximum vertical frequency and at a horizontal frequency of about 5 MHz. This image of the luminance signal must be removed.

Figure 11:
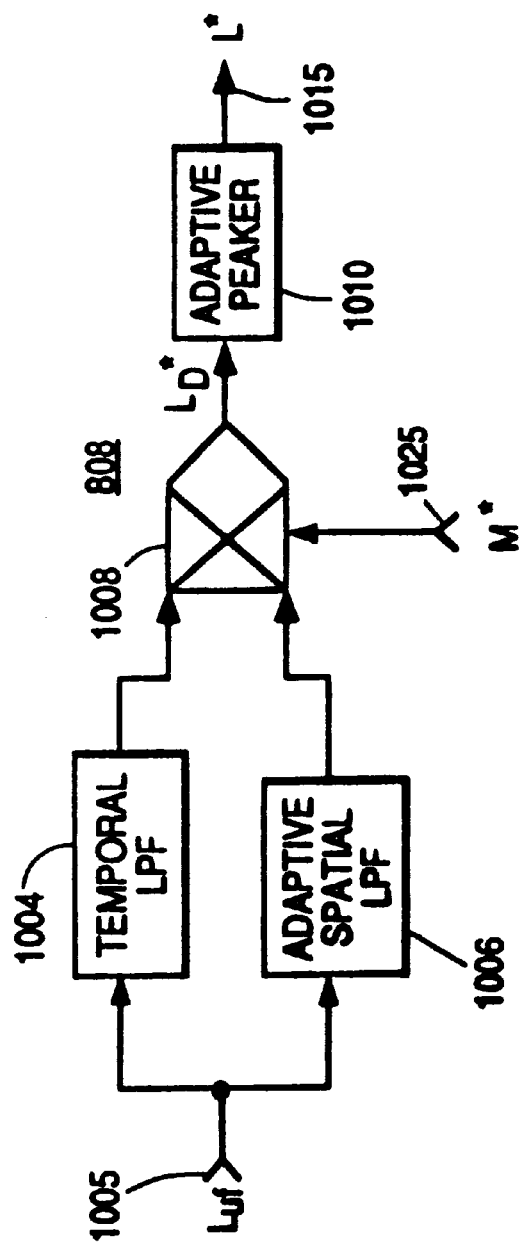
FIG. 11 is a more detailed block diagram of another portion of the adaptive unfolding circuit illustrated in FIG. 9.

FIG. 11 is a more detailed block diagram of a second portion of an adaptive unfolding circuit 808 illustrated in FIG. 9. In FIG. 11, an input terminal 1005 is coupled to the output terminal of adder 902 (of FIG. 10). Input terminal 1005 is coupled to respective input terminals of a temporal low pass filter LPF 1004 and an adaptive spatial LPF 1006. An output terminal of temporal LPF 1004 is coupled to a first data input terminal of soft switch 1008. An output terminal of soft switch 1008 is coupled to an input terminal of an adaptive peaker circuit 1010. An output terminal of adaptive peaker circuit 1010 is coupled to an output terminal 1015. Output terminal 1015 is coupled to the luminance signal input terminal of the composite video signal generator 810 (of FIG. 9).

An output terminal of adaptive spatial LPF 1006 is coupled to a second data input terminal of soft switch 1008. An input terminal 1025 is coupled to the motion signal output terminal of the chrominance/motion signal separator 818 (of FIG. 9). Input terminal 1025 is coupled to a control input terminal of soft switch 1008.

As described above with respect to the folding carrier, the unfolding carrier frequency is selected to maximize the distance between the baseband luminance signal and the luminance image signal in the temporal, vertical and horizontal directions. But the spectral characteristics of the recorded luminance signal effect the spectral shape of the unfolded luminance signal and the image signal. Thus, the spectral characteristics of the recorded luminance signal must be used to adaptively filter out the image signal and leave only the full bandwidth unfolded luminance signal.

When the level of motion is low, the unfolded luminance signal lies at temporal low frequencies (close to temporal DC), and the luminance image signal lies close in the temporal direction to the unfolding carrier, which was selected to be far away from temporal DC. In the presence of motion, the luminance signal occupies a wider temporal bandwidth. In this case the image may overlap temporally with the unfolded luminance signal, and the image must be removed spatially.

Adaptive spatial LPF 1006 operates to adaptively spatially separate the unfolded luminance signal from the luminance image signal by adaptively spatially filtering the unfolded luminance signal $L_{uf}$. Above-referenced patent U.S. Pat. No. 5,430,497 describes in more detail an adaptive spatial LPF which may be used as the adaptive spatial LPF 1006 in FIG. 10, and it will not be discussed in more detail here.

Soft switch 1008 controls the proportion of the temporally separated and adaptively spatially separated unfolded full bandwidth luminance signals to be included in the unfolded luminance signal in response to the recovered motion control signal M*. When the level of motion is zero or nearly zero, the output of the soft switch 1008 is completely from the temporal LPF 1004. As the magnitude of motion gradually increases, the proportion of the input from the temporal LPF 1004 decreases and the proportion of the input from the adaptive spatial LPF 1006 increases. In the presence of relatively high levels of motion, the output from the soft switch 1008 is from the adaptive spatial LPF 1006.

The output from soft switch 1008 is a depeaked luminance signal LD*. (This signal was depeaked to attenuate the luminance high frequencies to allow for backward compatibility.) This signal is then adaptively peaked in adaptive peaker circuit 1010. Adaptive depeaker 506 (of FIGS. 6 or 7) operated to provide no depeaking when the high frequency component of the luminance signal was zero or nearly zero, and provided maximum depeaking when the high frequency component was at a relatively high level. Conversely, when the level of the high frequency component of the depeaked luminance signal is zero or nearly zero, then no depeaking was performed and no peaking is necessary. When the level of the high frequency component of the depeaked luminance signal is higher, then some depeaking was performed and some peaking is necessary.

In a peaker, some amount of the high frequency portion of a signal is added back to a signal. In this case a peaker must be used to boost the attenuated luminance high frequencies to restore to their original level before the attenuation.

Adaptive peaker 1010 may be constructed in a similar manner as the adaptive depeaker 506 (of FIGS. 6 or 7). In one embodiment of an adaptive peaker as illustrated in FIG. 6, a horizontal high pass filter is substituted for the horizontal low pass filter 512. In this embodiment, the frequency characteristics of the luminance high frequency detector HPF (502) may be different from the frequency characteristics of the peaking HPF (512). In a second embodiment, the horizontal LPF 512 may be eliminated and the output terminal of the horizontal HPF 502 may also be coupled to the second input terminal of the soft switch 508. In a third embodiment, the circuit illustrated in FIG. 7 may be modified to perform this function.

FIG. 7 illustrates a combination of a horizontal comb filter 512 and soft switch 508. In the description of FIG. 7, the scaling factors K1 and K2 from lookup table 614 supplied to the multipliers 608 and 612 were selected to have the comb filter 512 perform as a low pass filter. However, the look-up table 614 may also be preprogrammed to have the comb filter 512 perform as a high pass filter. A standard three tap high pass filter exhibiting a raised cosine frequency response has the outer taps weighted by −¼ and the center tap weighted by +½. Thus if the look-up table 614 were properly preprogrammed, the comb filter 512 could operate as a high pass filter.

Referring now to FIG. 6, in the presence of zero high frequencies in the reconstructed luminance signal LD*, the level detector 504 generates a zero valued signal. In the presence of a maximum level of high frequencies, level detector 504 generates a maximum signal. Referring again to FIG. 7, when the detected level of the high frequency component of the depeaked signal is relatively high, then the high pass filtered reconstructed luminance signal is passed to the output terminal. In this case, the scaling factor K1 is −¼ and the scaling factor K2 is ½, and the high frequencies are boosted relative to the low frequencies. As the level of the high frequency component of the depeaked luminance signal gradually decreases, the proportion of high pass filtered depeaked luminance signal is decreased in a continuous manner, and the proportion of unfiltered depeaked luminance signal is increased in a continuous manner. When the detected level of the high frequency component of the depeaked luminance signal is zero or nearly zero, then the unfiltered depeaked luminance signal is passed to the output terminal. In this case, the scaling factor K1 is zero and the scaling factor K2 is one, and no boost is provided. By properly preprogramming the look-up table 614, the adaptive peaking may be made the inverse operation of the adaptive depeaking done in the record channel. However, it may be desirable that the maximum level of boost applied to the depeaked luminance signal be limited to a lesser value than the maximum value theoretically necessary to completely reconstruct the original luminance signal.

During recording it is possible to derive a motion signal for adaptive chrominance/luminance signal separation from the input composite video signal itself. False motion may be introduced by the chrominance signal, but the false motion in the chrominance/luminance signal separator can be eliminated by vertically and horizontally low pass filtering the temporally high pass filtered signal. Because the chrominance sidebands do not extend down below 2 MHz, horizontal filtering ensures that false motion is removed.

As described above, the luminance high frequencies are folded into the low frequency luminance signal by modulating them on a folding carrier signal and placing this carrier in the Fukinuki hole, similar to the manner in which the chrominance subcarrier is placed in the composite video signal. However, there are no restrictions on the lower sidebands of the folded luminance high frequencies. In fact, diagonal detail in the full bandwidth luminance signal, when folded into the luminance low frequencies can extend all the way down to spatial DC. Because the folding carrier is alternating on a frame-to-frame basis (to maximize the temporal distance from DC) these diagonal details incorrectly get detected as false motion and no degree of spatial filtering can remove this false motion detection. Thus, to properly remove the reflected luminance single from the unfolded luminance signal on playback, it, is necessary to supply a separate channel for the motion representative signal.

One skilled in the art of video signal processor design will recognize that providing a separate channel for supplying the motion representative signal to the playback circuitry allows the motion adaptive luminance reconstruction process in the playback circuitry to mimic the motion adaptive processing of the chrominance/luminance signal separator in the record circuitry. For example, if the chrominance/luminance signal separator in the record circuitry chose temporal processing in some region of the image to derive the luminance signal, it would be incorrect to choose spatial processing to reconstruct the full bandwidth luminance signal in the same region of the image.

Further, the chrominance/luminance signal separation process, no matter how well done, introduces some artifacts into the image. The full bandwidth luminance signal reconstruction process also introduces artifacts into the image. If the second process is independent of the first process, then the artifacts introduced by the upstream process have artifacts introduced upon them by the downstream process, intensifying them. Artifact intensification can be greatly reduced if the downstream processing can be forced to follow the upstream processing. Providing a separate channel for the motion representative signal allows for both the above improvements.

It should be further noted that in a single VCR, there are some circuits which may be shared between the record channel and the playback channel. For example, the modulators 518 and 902 may be a single modulator shared by use of an appropriate switching matrix, which may be constructed in a known manner. In addition, the adaptive depeaker 506 and the adaptive peaker 910 may be a single circuit shared by use of an appropriate switching matrix. This switching matrix also must either switch between two separate look-up tables, one (614) for the depeaker 506 and a separate one for the peaker 910, or alternatively a single look-up table may have a separate bit in the address input port of the ROM which effectively divides the storage locations in the ROM into two halves and indicates which half is to be used for the current operation—depeaking for recording or peaking for playback.

One skilled in the art of designing VCRs or television apparatus will by acquaintance with the foregoing disclosure be enabled to design other embodiments of the inventions described and this should be borne in mind when construing the scope of the claims which follow. For example, an earlier embodiment of the invention described herein, used adaptive unfolder circuitry alternative to that described above. This alternative adaptive unfolding circuitry used unfolding circuitry that succeeded, rather than preceded, the temporal low-pass filter 1004 and adaptive spatial low-pass filter 1006. The responses of these filters had to be separately unfolded in respective unfolding circuits before their application to the soft switch 1008, however, if some high-frequency detail was to be retained during motion. The requirement for two separate unfolding circuits led to this embodiment not being the preferred embodiment of the adaptive unfolding circuitry. An embodiment using unfolding circuitry that discarded high-frequency detail from the spatial low-pass filter was also found not to be preferred.

The scope of each of the claims which follow is contemplated to include digital apparatus operative in the sampled-data domain, even though the signal processing carried out may be described in terms of procedures performed on continuous signals analogous to the actual sampled-data signals.

What is claimed is:

1. In a system for processing a television-type signal, apparatus for processing high frequency video information comprising:

means for providing an input video signal having a frequency spectrum including a high frequency band and a lower frequency band;

means for folding said frequency spectrum of said input video signal around a prescribed folding frequency in said lower frequency band to provide a folded video signal;

means for combining said input video signal and said folded video signal to produce a combined video signal; and means for low pass filtering said combined video signal to provide a filtered signal, said low pass filtering means having a cut-off frequency corresponding to said prescribed folding frequency.

2. Apparatus according to claim 1, wherein said low pass filtering means exhibits an amplitude attenuation characteristic that is substantially anti-symmetrical with respect to said prescribed folding frequency.

3. Apparatus according to claim 1, wherein said input video signal is a wideband video signal, and said combined video signal is subject to being conveyed via a transmission channel including bandwidth restricting means whereby an output video signal from said transmission channel exhibits a narrow bandwidth relative to said input video signal.

4. Apparatus according to claim 1, wherein said input video signal is a luminance signal, and said apparatus further comprising:
  means for modulating the frequency of a carrier wave with said filtered signal.

5. Apparatus according to claim 4, wherein said system is of a type that processes said television-type signal for recording on an electromagnetic tape and includes:
  luminance record circuitry within which said means for modulating the frequency of a carrier wave is included.

6. Apparatus according to claim 3, wherein said output video signal from said transmission channel exhibits a bandwidth compatible with NTSC standards.

7. Apparatus according to claim 1, wherein said low pass filtering means is of a type exhibiting linear phase response through its passband, through its cut-off region, and into its stopband.

8. Apparatus according to claim 1, wherein said low pass filtering means is a digital filter of finite impulse response type.

9. Apparatus according to claim 1, wherein said input video signal is a luminance signal, and said prescribed folding frequency is the cross-over frequency between said high frequency band and said lower frequency band.

10. Apparatus according to claim 1, wherein said means for folding said frequency spectrum of said input video signal around said prescribed folding frequency comprises:
  frequency-selective de-emphasis circuitry for de-emphasizing the high frequency band of said input video signal respective to said lower frequency band of said input video signal before folding said frequency spectrum thereof.

11. Apparatus according to claim 10, wherein said frequency-selective de-emphasis circuitry is of a type in which the de-emphasis of the high frequency band of said input video signal respective to said lower frequency band of said input video signal is controlled responsive to an electric control signal, and said apparatus further comprising:
  means, responsive to the level of said input video signal as contained within the high frequency band thereof, for generating said electric control signal so as to de-emphasize the high frequency band of said input video signal respective to said lower frequency band of said input video signal less when the level of said input video signal as contained within the high frequency band thereof is relatively low than when it is relatively high.

12. Apparatus according to claim 1, wherein:
  said means for providing an image-representative input video signal comprises means for digitizing said image-representative input video signal for application to said means for folding said frequency spectrum of said input video signal around said prescribed folding frequency;
  said means for folding said frequency spectrum of said input video signal around said prescribed folding frequency comprises a digital multiplier for multiplying said digitized image-representative input video signal by a digitized folding carrier wave signal to generate a digital product signal;
  said means for combining said input video signal and said folded video signal to produce a combined video signal comprises a digital adder for adding together said digital product signal and said digitized image-representative input video signal to generate said folded video signal in digital form; and
  said means for low pass filtering said combined video signal to provide a filtered signal comprises a digital low pass filter of finite impulse response type.

13. In a system for processing a television-type signal, apparatus for encoding and decoding high frequency information comprising:
  means for providing an image-representative input video signal having a frequency spectrum including a high frequency band containing information to be encoded and a lower frequency band;
  means for folding said frequency spectrum of said input video signal around a prescribed folding frequency in said lower frequency band to provide a folded-video signal;
  means for combining said input video signal and said folded video signal to produce a combined video signal;
  means for low pass filtering said combined video signal to provide a filtered combined signal composed of a filtered video signal component and a filtered folded video signal component, said low pass filtering means having a cut-off frequency corresponding to said prescribed folding frequency;
  means for unfolding said filtered folded video signal component around said prescribed folding frequency to produce an unfolded video signal containing frequencies in said high frequency band; and
  means for joining said unfolded video signal to said high frequency band of said filtered video signal component to produce an output video signal with the highest frequencies thereof determined primarily by said unfolded video signal.

14. A system according to claim 13, wherein said low pass filtering means exhibits an amplitude attenuation characteristic that is substantially anti-symmetrical with respect to said prescribed folding frequency.

15. Apparatus according to claim 13, wherein:
  said input video signal is a wideband video signal;
  said combined video signal includes said folded video signal at times when input images represented by said input video signal exhibit frame-to-frame motion as well as at times when they do not;
  said filtered combined video signal is conveyed via a transmission channel including means for restricting bandwidth, said means for restricting bandwidth including said means for low pass filtering said combined video signal, whereby a response obtained from said transmission channel exhibits a narrow bandwidth relative to said input video signal; and
  said output video signal is a wideband video signal relative to said response obtained from said transmission channel.

16. Apparatus according to claim 13, wherein said input video signal is a luminance signal, and said folding frequency is the cross-over frequency between said high frequency band and said lower frequency band.

17. Apparatus according to claim 15, wherein said output video signal from said transmission channel exhibits a bandwidth compatible with NTSC standards.

18. Apparatus according to claim 13, wherein said means for folding said frequency spectrum of said input video signal around said prescribed folding frequency comprises:
  frequency-selective de-emphasis circuitry for de-emphasizing the high frequency band of said input video signal respective to said lower frequency band of said input video signal before folding said frequency spectrum thereof.

19. Apparatus according to claim 18, further comprising:
frequency-selective re-emphasis circuitry for re-emphasizing the high frequency band of said output video signal respective to said lower frequency band of said output video signal.

20. Apparatus according to claim 18, wherein said frequency-selective de-emphasis circuitry is of a type in which the de-emphasis of the high frequency band of said input video signal respective to said lower frequency band of said input video signal is controlled responsive to an electric control signal, and said apparatus further comprising:
means, responsive to the level of said input video signal as contained within the high frequency band thereof, for generating said electric control signal so as to de-emphasize the high frequency band of said input video signal respective to said lower frequency band of said input video signal less when the level of said input video signal as contained within the high frequency band thereof is relatively low than when it is relatively high.

21. Apparatus according to claim 20, further comprising:
frequency-selective re-emphasis circuitry for re-emphasizing the high frequency band of said output video signal respective to said lower frequency band of said output video signal.

22. Apparatus according to claim 21, wherein said frequency-selective re-emphasis circuitry is of a type in which the re-emphasis of the high frequency band of said output video signal respective to said lower frequency band of said input video signal is controlled responsive to a further electric control signal, and said apparatus further comprising:
means, responsive to the level of said output video signal as contained within the high frequency band thereof, for generating said further electric control signal so as to re-emphasize the high frequency band of said output video signal respective to said lower frequency band of said output video signal less when the level of said output video signal as contained within the high frequency band thereof is relatively low than when it is relatively high.

23. Apparatus according to claim 13, wherein said low pass filtering means is of a type exhibiting linear phase response through its passband, through its cut-off region, and into its stopband.

24. Apparatus according to claim 13, wherein said low pass filtering means is a digital filter of finite impulse response type.

25. Apparatus according to claim 13, wherein:
said means for providing an image-representative input video signal comprises means for digitizing said image-representative input video signal for application to said means for folding said frequency spectrum of said input video signal around said prescribed folding frequency;
said means for folding said frequency spectrum of said input video signal around said prescribed folding frequency comprises a digital multiplier for multiplying said digitized image-representative input video signal by a digitized folding carrier wave signal to generate a digital product signal;
said means for combining said input video signal and said folded video signal to produce a combined video signal comprises a digital adder for adding together said digital product signal and said digitized image-representative input video signal to generate said folded video signal in digital form; and said means for low pass filtering said combined video signal to provide a filtered signal comprises a digital low pass filter of finite impulse response type.

26. Apparatus according to claim 25, wherein said means for separating said filtered combined signal into a filtered video signal component and a filtered folded video signal component, said means for unfolding said filtered folded video signal component, said means for unfolding said filtered folded video signal component, and said means for joining said unfolded video signal to said high frequency band of said filtered video signal component from said separating means to produce an output video signal are of types operative in the digital domain.

27. In a system for processing a television-type signal, apparatus for encoding and decoding high frequency information comprising:
means for providing an image-representative input video signal having a frequency spectrum including a high frequency band containing information to be encoded, and a lower frequency band;
means for folding said frequency spectrum of said input video signal around a prescribed folding frequency to provide a folded video signal;
means for combining said input video signal and said folded video signal to produce a combined video signal;
means for low pass filtering said combined video signal to provide a filtered combined signal, said low pass filtering means having a cut-off frequency corresponding to said prescribed folding frequency;
means for unfolding said filtered combined video signal around said prescribed folding frequency to produce an unfolded video signal containing frequency in said high frequency band; and
means for filtering said unfolded video signal to generate an output video signal in which aliases generated by unfolding are suppressed.

28. Apparatus according to claim 27, wherein said low pass filtering means is of a type exhibiting linear phase response through its passband, through its cut-off region, and into its stopband.

29. Apparatus according to claim 27, wherein said low pass filtering means is a digital filter of finite impulse response type.

30. Apparatus according to claim 27, wherein:
said filtered combined video signal comprises a first component and further comprises a second component encoded so as to reverse phase from one image frame to the next;
said means for filtering said unfolded video signal to suppress aliases generated by unfolding is responsive to said luminance information and is motion-adaptive; and
said unfolding means responds to a reference signal having a phase which reverses from frame to frame.

31. Apparatus according to claim 30, wherein said means for folding said frequency spectrum of said input video signal around said prescribed folding frequency comprises:
frequency-selective de-emphasis circuitry for de-emphasizing the high frequency band of said input video signal respective to said lower frequency band of said input video signal before folding said frequency spectrum thereof.

32. Apparatus according to claim 31, further comprising:
frequency-selective re-emphasis circuitry for re-emphasizing the high frequency band of said output video signal respective to said lower frequency band of said output video signal.

33. Apparatus according to claim 31, wherein said frequency-selective de-emphasis circuitry is of a type in which the de-emphasis of the high frequency band of said input video signal respective to said lower frequency band of said input video signal is controlled responsive to an electric control signal, and said apparatus further comprising:

means, responsive to the level of said input video signal as contained within the high frequency band thereof, for generating said electric control signal so as to de-emphasize the high frequency band of said input video signal respective to said lower frequency band of said input video signal less when the level of said input video signal as contained within the high frequency band thereof is relatively low than when it is relatively high.

34. Apparatus according to claim 33, further comprising:

frequency-selective re-emphasis circuitry for re-emphasizing the high frequency band of said output video signal respective to said lower frequency band of said output video signal.

35. Apparatus according to claim 34, wherein said frequency-selective re-emphasis circuitry is of a type in which the re-emphasis of the high frequency band of said output video signal respective to said lower frequency band of said input video signal is controlled responsive to a further electric control signal, and said apparatus further comprising:

means, responsive to the level of said output video signal as contained within the high frequency band thereof, for generating said further electric control signal so as to re-emphasize the high frequency band of said output video signal respective to said lower frequency band of said output video signal less when the level of said output video signal as contained within the high frequency band thereof is relatively low than when it is relatively high.

36. Apparatus according to claim 27, wherein said means for folding said frequency spectrum of said input video signal around a prescribed folding frequency comprises:

frequency-selective de-emphasis circuitry for de-emphasizing the high frequency band of said input video signal respective to said lower frequency band of said input video signal before folding said frequency spectrum thereof.

37. Apparatus according to claim 36, further comprising:

frequency-selective re-emphasis circuitry for re-emphasizing the high frequency band of said output video signal respective to said lower frequency band of said output video signal.

38. Apparatus according to claim 36, wherein said frequency-selective de-emphasis circuitry is of a type in which the de-emphasis of the high frequency band of said input video signal respective to said lower frequency band of said input video signal is controlled responsive to an electric control signal, and said apparatus further comprising:

means, responsive to the level of said input video signal as contained within the high frequency band thereof, for generating said electric control signal so as to de-emphasize the high frequency band of said input video signal respective to said lower frequency band of said input video signal less when the level of said input video signal as contained within the high frequency band thereof is relatively low than when it is relatively high.

39. Apparatus according to claim 38, further comprising:

frequency-selective re-emphasis circuitry for re-emphasizing the high frequency band of said output video signal respective to said lower frequency band of said output video signal.

40. Apparatus according to claim 39, wherein said frequency-selective re-emphasis circuitry is of a type in which the re-emphasis of the high frequency band of said output video signal respective to said lower frequency band of said input video signal is controlled responsive to a further electric control signal, said apparatus further comprising:

means, responsive to the level of said output video signal as contained within the high frequency band thereof, for generating said further electric control signal so as to re-emphasize the high frequency band of said output video signal respective to said lower frequency band of said output video signal less when the level of said output video signal as contained within the high frequency band thereof is relatively low than when it is relatively high.

41. Apparatus according to claim 27, wherein:

said means for providing an image-representative input video signal comprises means for digitizing said image-representative input video signal for application to said means for folding said frequency spectrum of said input video single around said prescribed folding frequency;

said means for folding said frequency spectrum of said input video signal around said prescribed folding frequency comprises a digital multiplier for multiplying said digitized image-representative input video signal by a digitized folding carrier wave signal to generate a digital product signal;

said means for combining said input video signal and said folded video signal to produce a combined video signal comprises a digital adder for adding together said digital product signal and said digitized image-representative input video signal to generate said folded video signal in digital form; and said means for low pass filtering said combined video signal to provide a filtered signal comprises a digital low pass filter of finite impulse response type.

42. Apparatus according to claim 41, wherein said means for unfolding said filtered combined video signal and said means for filtering said unfolded video signal to suppress aliases generated by unfolding are operative in the digital domain.

43. Apparatus for processing an analog composite video signal of given bandwidth to generate a reduced-bandwidth signal extending to an uppermost frequency below the frequency range in which the color subcarrier and its chrominance sidebands fall, the reduced bandwidth of said reduced-bandwidth signal being at least half said given bandwidth, said apparatus comprising:

an analog-to-digital converter for digitizing said composite video signal to generate a digitized composite video signal;

motion detecting means for detecting when the absolute value of changes between a current television image described by said composite video signal and a preceding television image described by said composite video signal exceed a prescribed value, thereby to generate a motion signal;

a motion-adaptive digital filter for separating from said digitized composite video signal a luma component thereof, as selected in accordance with said motion signal;

circuitry operative in the digital domain for folding the portions of the separated luma component of said digitized composite video signal that are above said restricted bandwidth in the direction parallel to scan lines around the uppermost frequency in said restricted bandwidth in the direction parallel to scan lines; and a first digital-to-analog converter for converting said digitized folded luma signal to an analog folded luma signal.

44. Apparatus as set forth in claim 43 further comprising:
a chroma separator for separating from said digitized composite video signal a chroma component thereof descriptive of the chrominance sidebands of said analog composite video signal;

a second digital-to-analog converter for converting said chroma component of said digitized composite video signal, as separated by said chroma separator, to an analog chroma signal;

means for combining said analog folded luma signal and said analog chroma signal to generate a recording signal; and means for recording said recording signal on a magnetic storage medium.

45. Apparatus as set forth in claim 43 wherein said circuitry operative in the digital domain for folding comprises:
means for generating a digitized folding carrier wave of a frequency at least as high as the highest frequency of said composite video signal;

a digital multiplier for multiplying said digitized folding carrier wave by at least a portion of said luma component of said digitized composite video signal to generate a digital product signal;

a digital adder for adding the digital product supplied from said digital multiplier to said digitized composite video signal to generate a digital sum signal; and a digital lowpass filter with a cut-off in response at said uppermost frequency of said reduced-bandwidth signal, said digital lowpass filter connected for responding to said digital sum signal.

46. Apparatus for processing an analog composite video signal of given bandwidth to generate a reduced-bandwidth signal extending to an uppermost frequency below the frequency range in which the color subcarrier and its chrominance sidebands fall, the reduced bandwidth of said reduced-bandwidth signal being at least half said given bandwidth, said apparatus comprising:
an analog-to-digital converter for digitizing said composite video signal to generate a digitized composite video signal;

motion detecting means for detecting when the absolute value of changes between a current television image described by said composite video signal and a preceding television image described by said composite video signal exceed a prescribed value, thereby to generate a motion signal;

a signal spreader for low-pass spatially filtering said motion signal to generate a spread motion signal;

a motion-adaptive digital filter for separating from said digitized composite video signal a luma component thereof, said motion-adaptive digital filter comprising
a first digital filter responding to said digitized composite video signal to provide a response from which are removed diagonal high spatial frequencies above half-line-frequency in the direction transversal to scan lines and above said restricted bandwidth in the direction parallel to scan lines, a second digital filter responding to said digitized composite video signal to provide a response from which are removed frame-to-frame changes above said restricted bandwidth in the direction parallel to scan lines, and a soft switch responding to said spread motion signal for selecting as the separated luma component of said digitized composite video signal primarily the response of said first digital filter as said spread motion signal more strongly indicates presence of motion in said composite video signal and primarily the response of said second digital filter as said spread motion signal more strongly indicates absence of motion in said composite video signal; and circuitry for folding the portions of the separated luma component of said digitized composite video signal that are above said restricted bandwidth in the direction parallel to scan lines around the uppermost frequency in said restricted bandwidth in the direction parallel to scan lines.

47. Apparatus as set forth in claim 46 further comprising:
a first digital-to-analog converter for converting said luma component of said digitized composite video signal, as folded by said circuitry for folding, to an analog folded luma signal;

a chroma separator for separating from said digitized composite video signal a chroma component thereof descriptive of the chrominance sidebands of said analog composite video signal;

a second digital-to-analog converter for converting said chroma component of said digitized composite video signal, as separated by said chroma separator, to an analog chroma signal;

means for combining said analog folded luma signal and said analog chroma signal to generate a recording signal; and means for recording said recording signal on a magnetic storage medium.

48. Apparatus as set forth in claim 46 wherein said circuitry operative in the digital domain for folding comprises:
means for generating a digitized folding carrier wave of a frequency at least as high as the highest frequency of said composite video signal;

a digital multiplier for multiplying said digitized folding carrier wave by at least a portion of said luma component of said digitized composite video signal to generate digital product signal;

a digital adder for adding the digital product signal supplied from said digital multiplier to said digitized composite video signal to generate a digital sum signal; and a digital lowpass filter with a cut-off in response at said uppermost frequency of said reduced-bandwidth signal, said digital lowpass filter connected for responding to said digital sum signal.

49. Apparatus as set forth in claim 46 wherein said first digital filter is of a type that removes high spatial frequencies above half-line-frequency in the direction transversal to scan lines only if they are also above said restricted bandwidth in the direction parallel to scan lines.

50. Apparatus as set forth in claim 46 wherein said first digital filter is of a type that removes high spatial frequencies above said restricted bandwidth in the direction parallel to scan lines only if they are also above half-line-frequency in the direction transversal to scan lines.

51. Apparatus as set forth in claim 50 wherein said first digital filter is of a type that removes high spatial frequencies above half-line-frequency in the direction transversal to scan lines only if they are also above said restricted bandwidth in the direction parallel to scan lines.

52. Apparatus as set forth in claim 51, said first digital filter comprising:
- a digital horizontal high pass filter and a digital vertical high pass filter connected together in a first cascade connection for responding to said digitized composite video signal to supply a diagonal high pass filter response;
- means for delaying said digitized composite video signal to generate a delayed digitized composite video signal in temporal alignment with said diagonal high pass filter response to said digitized composite video signal; and
- means for differentially responding to said diagonal high pass filter response and said delayed digitized composite video signal, thereby to generate said response of said first digital to filter.

53. Apparatus as set forth in claim 52 wherein said digital vertical high pass filter precedes said digital horizontal high pass filter in said first cascade connection.

54. Apparatus as set forth in claim 52, said second digital filter comprising:
- means for delaying said digitized composite video signal one frame time thereof;
- means for differentially responding to said digitized composite video signal and to said digitized composite video signal as delayed one frame time to sense the frame-to-frame changes in said digitized composite video signal; and
- a digital horizontal high pass filter for responding to the frame-to-frame changes in said digitized composite video signal as so sensed to generate said response of said second digital filter.

55. Apparatus as set forth in claim 54 wherein said means for delaying said digitized composite video signal one frame time thereof and said means for delaying said digitized composite video signal to generate a delayed digitized composite video signal in temporal alignment with said diagonal high pass filter response to said digitized composite video signal both include and share with the other:
- a one-horizontal-scan-line digital delay line for said digitized composite video signal.

56. Apparatus as set forth in claim 51 wherein said second digital filter is composed of a second cascade connection of first and second component filters, each having a respective input port and a respective output port, the output port of one of which first and second component filters connects to the input port of the other within said second cascade connection of first and second component filters, said first component filter comprising
- a digital horizontal high pass filter, and said second component filter comprising:
  - means for delaying a signal supplied to the input port of said second component filter one frame time thereof; and
  - means for differentially responding to said signal supplied to the input port of said second component filter and to said signal supplied to the input port of said second component filter as delayed one frame time to generate a response at the output port of said second component filter.

57. Apparatus as set forth in claim 46 wherein said second digital filter is composed of a cascade connection of first and second component filters, each having a respective input port and a respective output port, the output port of one of which first and second component filters connects to the input port of the other within said cascade connection of first and second component filters, said first component filter comprising
- a digital horizontal high pass filter, and said second component filter comprising:
  - means for delaying a signal supplied to the input port of said second component filter one frame time thereof; and
  - means for differentially responding to said signal supplied to the input port of said second component filter and to said signal supplied to the input port of said second component filter as delayed one frame time to generate a response at the output port of said second component filter.

58. Apparatus for processing an analog composite video signal of given bandwidth to generate a reduced-bandwidth signal extending to an uppermost frequency below the frequency range in which the color subcarrier and its chrominance sidebands fall, the reduced bandwidth of said reduced-bandwidth signal being at least half said given bandwidth, said apparatus comprising:
- an analog-to-digital converter for digitizing said composite video signal to generate a digitized composite video signal;
- a digital filter for separating from said digitized composite video signal a luma component thereof; and
- circuitry operative in the digital domain for folding the portions of the separated luma component of said digitized composite video signal that are above said restricted bandwidth in the direction parallel to scan lines around the uppermost frequency in said restricted bandwidth in the direction parallel to scan lines.

59. Apparatus as set forth in claim 58 wherein said circuitry operative in the digital domain for folding comprises:
- means for generating a digitized folding carrier wave of a frequency at least as high as the highest frequency of said composite video signal;
- a digital multiplier for multiplying said digitized folding carrier wave by at least a portion of said luma component of said digitized composite video signal to generate a digital product signal;
- a digital adder for adding the digital product supplied from said digital multiplier to said digitized composite video signal to generate a digital sum signal; and
- a digital lowpass filter with a cut-off in response at said uppermost frequency of said reduced-bandwidth signal, said digital lowpass filter connected for responding to said digital sum signal.

60. Apparatus for processing an analog folded luminance signal folded at a folding frequency, said apparatus comprising:
- an analog-to-digital converter for digitizing said analog folded luminance signal to generate a digitized folded luminance signal;
- a source of a digitized unfolding carrier wave;
- a digital multiplier for multiplying said digitized folded luminance signal by said digitized unfolding carrier wave to generate a digital product signal;

a digital adder for adding the digital product signal supplied from said digital multiplier to said digitized folded luminance signal to generate a digital sum signal including undesired sidebands of said unfolding carrier wave; and further digital signal processing circuitry for generating a digital recovered full band luminance signal in response to said digital sum signal, including a digital filter for suppressing said undesired sidebands of said unfolding carrier wave in said digital recovered full band luminance signal.

61. Apparatus according to claim 60, wherein a motion signal is supplied descriptive of frame-to-frame changes in the fullband luminance signal described by said analog folded luminance signal folded at said folding frequency, and wherein said digital filter for suppressing said undesired sidebands of said unfolding carrier wave is a motion-adaptive digital filter comprising:

a first digital filter providing an adaptive spatial low pass filter response to said digital sum signal, a second digital filter providing a temporal low pass filter response to said digital sum signal, and a soft switch responding to said motion signal for selecting as said digital recovered fullband luminance signal primarily the response of said first digital filter as said motion signal more strongly indicates presence of motion in said fullband luminance signal and primarily the response of said second digital filter as said motion signal more strongly indicates absence of motion in said fullband luminance signal.

\* \* \* \* \*